(12) United States Patent
Oya et al.

(10) Patent No.: US 6,208,379 B1
(45) Date of Patent: Mar. 27, 2001

(54) CAMERA DISPLAY CONTROL AND MONITORING SYSTEM

(75) Inventors: Takashi Oya, Kyoto; Tomoaki Kawai, Yokohama; Kazuko Suzuki, Yokohama; Shinya Urisaka, Yokohama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/802,065

(22) Filed: Feb. 19, 1997

(30) Foreign Application Priority Data

Feb. 20, 1996 (JP) .................................................. 8-032140
Mar. 22, 1996 (JP) .................................................. 8-066360

(51) Int. Cl.$^7$ .............................. H04N 5/232; H04N 7/18
(52) U.S. Cl. ......................... 348/213; 348/143; 348/159
(58) Field of Search .................................. 348/207, 211, 348/212, 213, 218, 373, 375, 15, 16, 17, 47, 48, 143, 153, 159, 144, 145, 146, 147, 148, 149, 152, 154, 155, 156, 157, 158; 702/188; H04N 7/18, 5/232

(56) References Cited

U.S. PATENT DOCUMENTS

| | | | |
|---|---|---|---|
| 5,446,491 | * 8/1995 | Shibata et al. ........................ | 348/15 |
| 5,625,410 | * 4/1997 | Washino et al. ...................... | 348/154 |
| 5,745,161 | * 4/1998 | Ito .......................................... | 348/15 |
| 5,808,670 | * 9/1998 | Oyashiki et al. ...................... | 348/143 |
| 6,002,995 | * 12/1999 | Suzuki et al. ......................... | 348/143 |

FOREIGN PATENT DOCUMENTS 6-181539   6/1994   (JP) ............................... H04N/5/232

* cited by examiner

*Primary Examiner*—Tuan Ho
(74) *Attorney, Agent, or Firm*—Morgan & Finnegan, LLP

(57) ABSTRACT

A camera control system is disclosed where the control system selects a camera from a plurality of cameras connected to a network, and displays an image taken by the selected camera and further performs control functions on the selected camera. The control system first contains a map display, which represents the relative area where the plurality of controllable cameras are set. The control system next contains a symbol display configuration for representing each camera, and also contains a display-not-permitted area setting configuration, which disallows display functions relative to each network client's status on the network. The control system subsequently transmits each client's respective view and information in accordance to their request and corresponding status.

8 Claims, 43 Drawing Sheets

FIG. 5

| CAMERA NAME | HOST NAME | PAN, TILT, ZOOM | OWNER | ACCESS CONDITION | OTHER |
|---|---|---|---|---|---|
| CAMERA 1 | HOST 1 | (50, 10, 30) | USER 1 | USER3 | ----- |
| CAMERA 2 | HOST 1 | (20, 25, 0) | USER 1 | (NOT USED) | ----- |
| CAMERA 3 | HOST 2 | (−10, −5, 0) | USER 2 | (NOT USED) | ----- |
| CAMERA 4 | HOST 3 | (30, 0, 15) | USER 4 | USER1 | ----- |
| CAMERA 5 | HOST 3 | (−15, 15, 50) | USER 3 | (NOT USED) | ----- |
| ----- | ----- | ----- | ----- | ----- | ----- |

F I G. 6

| USER NAME | SOUND RECEPTION | IMAGE RECEPTION | CAMERA CONTROL |
|---|---|---|---|
| USER 1 | PERMITTED | PERMITTED | PERMITTED |
| USER 2 | PERMITTED | PERMITTED | PARTIALLY PERMITTED |
| USER 3 | PERMITTED | PERMITTED | PERMITTED |
| USER 4 | PERMITTED | PERMITTED | NOT PERMITTED |
| USER 5 | NOT PERMITTED | PERMITTED | NOT PERMITTED |
| USER 6 | PERMITTED | PERMITTED | NOT PERMITTED |
| USER 7 | NOT PERMITTED | PERMITTED | NOT PERMITTED |
| USER 8 | PERMITTED | PERMITTED | PERMITTED |
| ⋮ | ⋮ | ⋮ | ⋮ |
| USER n | NOT PERMITTED | NOT PERMITTED | NOT PERMITTED |

FIG. 7A

| GROUP NAME | GROUP MEMBER |
|---|---|
| GROUP 1 | USER 1   USER 3   USER 8 |
| GROUP 2 | USER 2 |
| GROUP 3 | USER 4   USER 6 |
| GROUP 4 | USER 5   USER 7 |
| ⋮ | ⋮ |
| GROUP m | USER n |

USER GROUP

FIG. 7B

| GROUP NAME | SOUND RECEPTION | IMAGE RECEPTION | CAMERA CONTROL |
|---|---|---|---|
| GROUP 1 | PERMITTED | PERMITTED | PERMITTED |
| GROUP 2 | PERMITTED | PERMITTED | PARTIALLY PERMITTED |
| GROUP 3 | PERMITTED | PERMITTED | NOT PERMITTED |
| GROUP 4 | NOT PERMITTED | PERMITTED | NOT PERMITTED |
| ⋮ | | | |
| GROUP m | NOT PERMITTED | NOT PERMITTED | NOT PERMITTED |

ACCESS PRIVILEGE FOR EACH GROUP

FIG. 8A

| GROUP NAME | SOUND RECEPTION | IMAGE RECEPTION | CAMERA CONTROL |
|---|---|---|---|
| GROUP 1 | PERMITTED | PERMITTED | PERMITTED |
| GROUP 2 | PERMITTED | PERMITTED | PERMITTED |
| OTHER GROUPS | PERMITTED | PERMITTED | NOT PERMITTED |

OPEN

FIG. 8B

| GROUP NAME | SOUND RECEPTION | IMAGE RECEPTION | CAMERA CONTROL |
|---|---|---|---|
| GROUP 1 | PERMITTED | PERMITTED | PERMITTED |
| GROUP 2 | PERMITTED | PERMITTED | NOT PERMITTED |
| OTHER GROUPS | NOT PERMITTED | NOT PERMITTED | NOT PERMITTED |

NORMAL

FIG. 8C

| GROUP NAME | SOUND RECEPTION | IMAGE RECEPTION | CAMERA CONTROL |
|---|---|---|---|
| GROUP 1 | NOT PERMITTED | PERMITTED | NOT PERMITTED |
| GROUP 2 | NOT PERMITTED | NOT PERMITTED | NOT PERMITTED |
| OTHER GROUPS | NOT PERMITTED | NOT PERMITTED | NOT PERMITTED |

CLOSED

FIG. 12

| USER ID | USER NAME | PASSWORD | PRIORITY RANK |
|---------|-----------|----------|---------------|
| 0 | MANAGER | ********* | 0 |
| 1 | OYA | ********* | 1 |
| 2 | KAWAI | ********* | 1 |
| 3 | YANO | ********* | 3 |
| ⋮ | ⋮ | ⋮ | ⋮ |
| 8 | NAMI | ********* | 2 |
| 9 | URI | ********* | 2 |

FIG. 18

ACCESS CONTROL PANEL

CAMERA NAME

- camera1
- camera2
- camera3

☐ PUBLIC
☒ PRIVATE

ACCESS MODE | NORMAL

ACCESS - PRIVILEGE SET

| CANCEL | OK |

FIG. 19

| CAMERA INFORMATION | |
|---|---|
| CAMERA NAME | camera1 |
| HOST NAME | host1 |
| CAMERA OWNER | urisaka |
| LOG - IN USER | urisaka |
| INITIAL - USER | kawai |
| CAMERA DELETE | RETURN TO ROUTE |

FIG. 20

| |
|---|
| OPEN |
| NORMAL |
| CLOSE |

FIG. 21

| | SOUND | IMAGE | CONTROL |
|---|---|---|---|
| GROUP 1 | PERMITTED | PERMITTED | PERMITTED |
| GROUP 2 | PERMITTED | PERMITTED | NOT PERMITTED |
| OTHER GROUP | NOT PERMITTED | PERMITTED | NOT PERMITTED |

ACCESS PRIVILEGE SETTING

CAMERA OWNER: urisaka

ACCESS MODE: NORMAL

CANCEL — DEFAULT — OK

FIG. 22

| PERMITTED |
|---|
| PARTIALLY PERMITTED |
| NOT PERMITTED |

FIG. 23

| OPEN |
|---|
| NORMAL |
| CLOSE |
| GENERATE NEW MODE |
| DELETE MODE |

FIG. 24

| GENERATE NEW MODE |
| --- |
| NAME OF NEW MODE   [_____] |
| [ CANCEL ]    [ OK ] |

FIG. 25

| DELETE MODE |
| --- |
| DELETE THIS MODE ? |
| [ CANCEL ]    [ OK ] |

DISPLAY - NOT - PERMITTED RANGE θd : d < θd < D

FIG. 37

| CAMERA NUMBER | CAMERA NAME | HOST NAME | CAMERA LOCATION | INITIAL ANGLE | PRESENT ANGLE | PRESENT VIDEO RANGE |
|---|---|---|---|---|---|---|
| 1 | camera1 | host1 | (150, 11) | 180 | 145 | (140, 220) |
| 2 | camera2 | ------ | ------ | ------ | ------ | ------ |
| ----- | ----- | | | | | |

A > D > a > d

FIG. 39
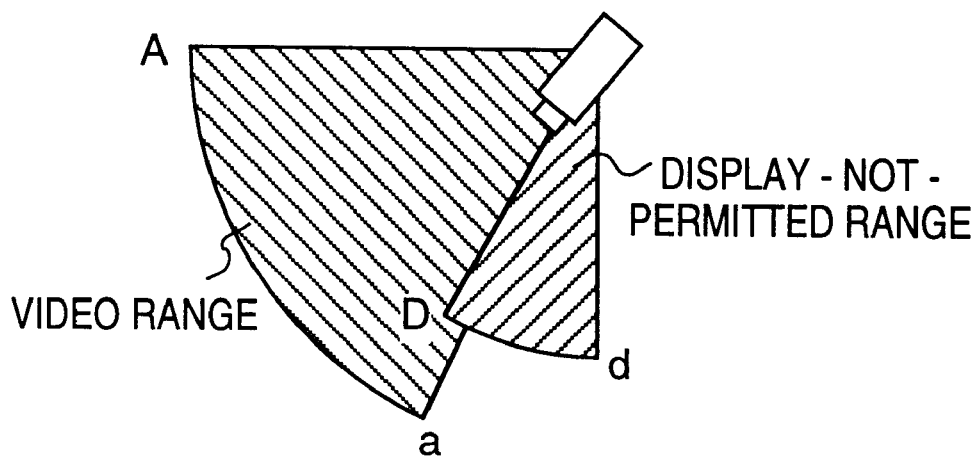
$A > D > a > d$
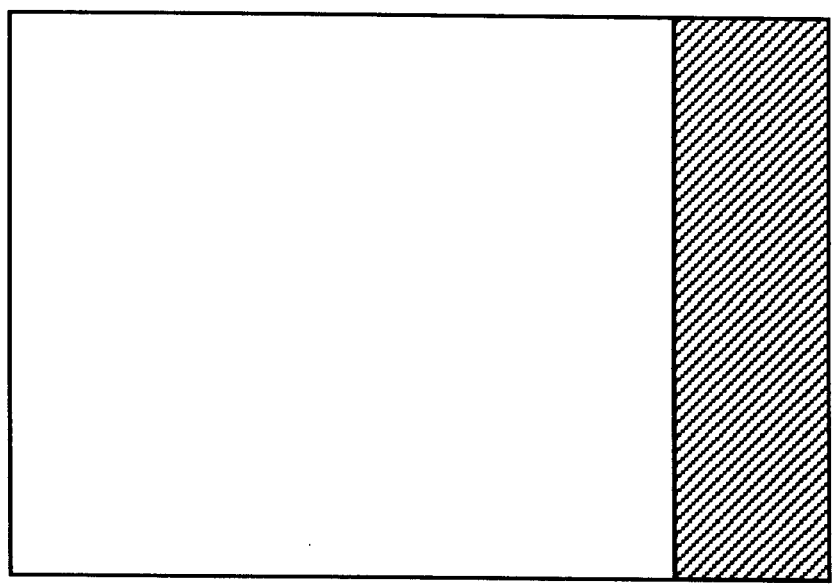
DISPLAYED SCREEN

FIG. 40
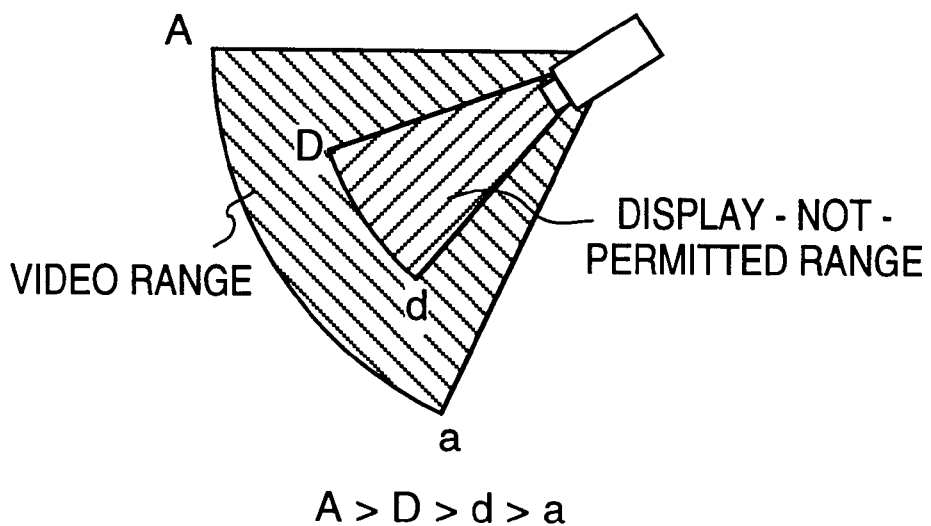
VIDEO RANGE
DISPLAY - NOT - PERMITTED RANGE
A > D > d > a
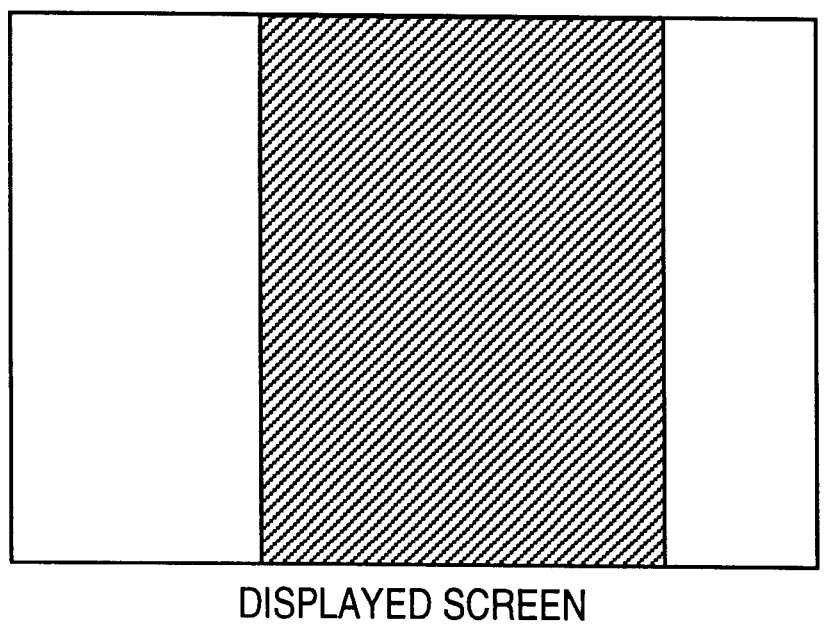
DISPLAYED SCREEN

FIG. 41
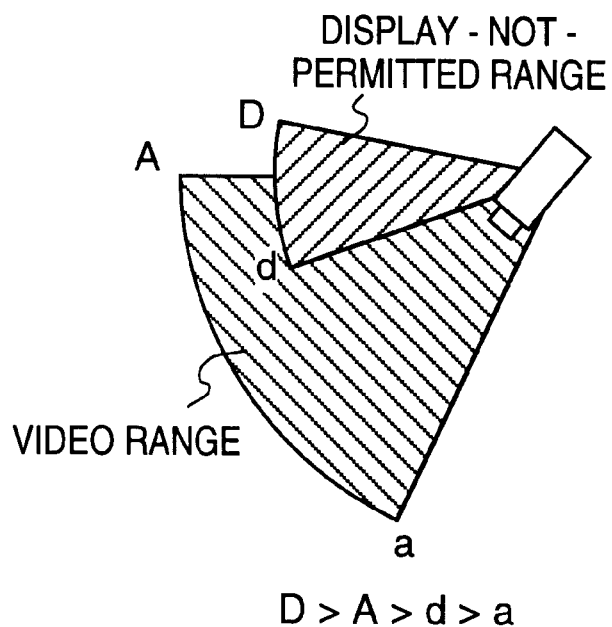
$D > A > d > a$
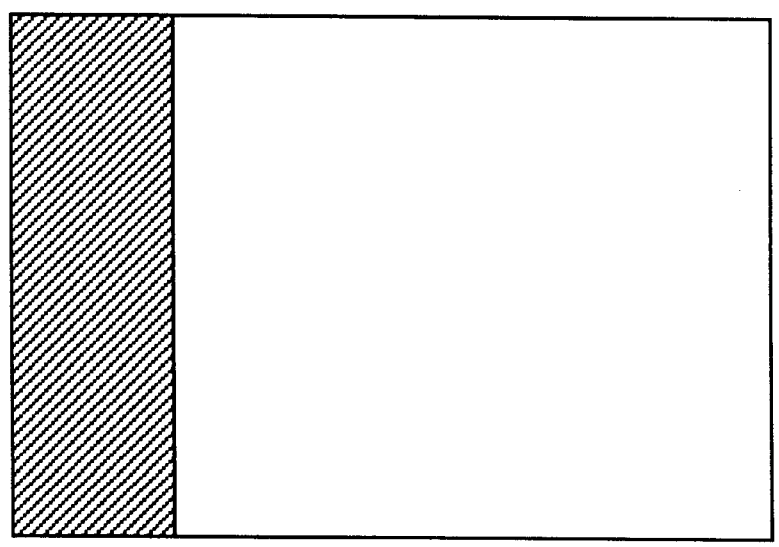
DISPLAYED SCREEN

FIG. 42
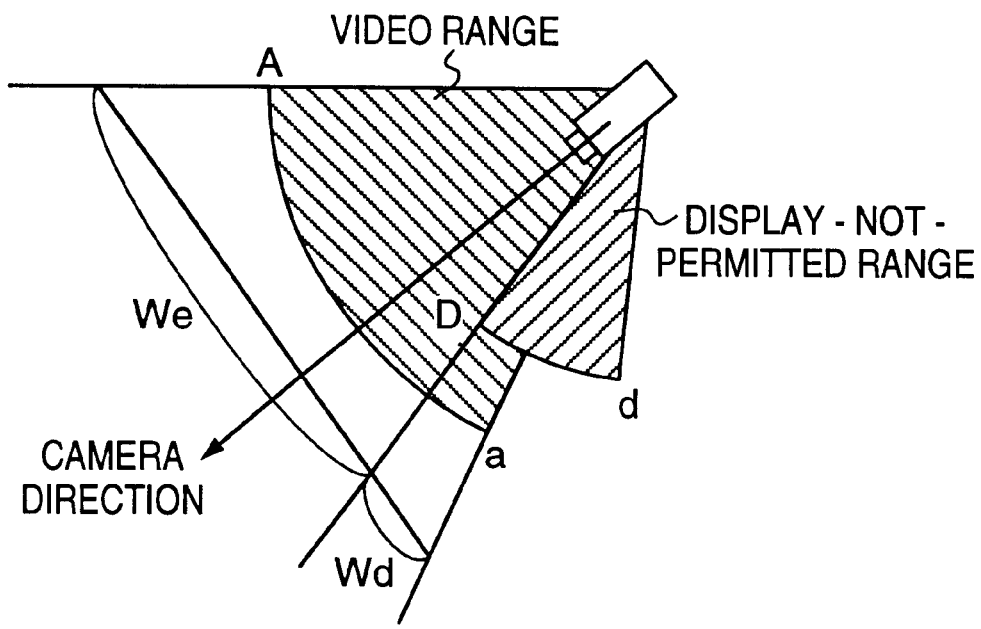
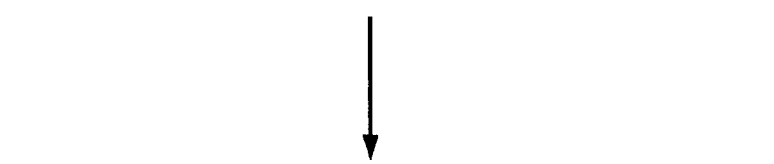
DISPLAYED SCREEN

CAMERA DISPLAY CONTROL AND MONITORING SYSTEM

BACKGROUND OF THE INVENTION

Present invention relates to a camera control system in a network system where one or a plurality of persons can selectively use data (e.g. an image or sound) from one or a plurality of information input apparatuses (e.g. a camera or a microphone) via a network.

A network system conventionally suggested as a video conference system is where a plurality of computers connected to video cameras and microphones are linked to a network for remotely controlling a camera connected to an arbitrary computer and receiving an image from the camera or sound from the microphone. In such system, an arbitrary user remotely controls a desired camera from an arbitrary computer and receives an image or sound.

In the system where image/sound communication and remote camera control are performed among a plurality of computers via a network, all the users are able to receive an image (or sound) from a desired camera (or a microphone) and remotely control the camera without any limitation. In addition, a user who can use a terminal is able to take advantage of all functions of the system.

In such conventional system, no limitation is set for remote operation and reception of an image/sound. Thus, a user of a terminal who transmits image/sound data cannot restrict a user who receives the data. Moreover, the user who transmits the data cannot select or specify a user to whom camera control is to be allowed. Since any arbitrary user can use the system, a problem in terms of security arises.

SUMMARY OF THE INVENTION

The present invention has been made in consideration of the above situation, and has as its object to provide a camera control system having an improved security function of the system by allowing access to the system to only those users who are pre-registered.

Moreover, another object of the present invention is to provide a camera control system which allows an owner of a camera to arbitrarily set a privilege of receiving an image and sound of his/her own camera and microphone as well as a privilege of controlling the camera.

Furthermore, another object of the present invention is to provide a camera control system which enables protection of personal privacy.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 shows an example of a camera list structure and contents thereof;

FIG. 6 shows an example of an access privilege setting table;

FIGS. 7A and 7B show examples of access privilege setting tables considering a user group;

FIGS. 8A, 8B and 8C show examples of access mode setting;

FIG. 12 shows an example of a user list stored in the camera management server 68;

FIG. 18 shows a route menu screen (access control panel) of an access-privilege-setting GUI;

FIG. 19 shows a camera information window of the access-privilege-setting GUI;

FIG. 20 shows an access-mode selection menu of the access-privilege-setting GUI;

FIG. 21 shows an access privilege setting window of the access-privilege-setting GUI;

FIG. 22 shows a selection menu in an access-privilege-display changing section of the access privilege setting window;

FIG. 23 shows a selection/operation window for an access mode of the access privilege setting window;

FIG. 24 shows a new-mode generating window of the selection/operation window in FIG. 23;

FIG. 25 shows a mode deleting window of the selection/operation window in FIG. 23;

FIG. 37 shows a camera-condition table;

FIG. 39 is an image display screen of case (1), where the video range and the display-not-permitted range overlap as illustrated;

FIG. 40 is an image display screen of case (2), where the video range and the display-not-permitted range overlap as illustrated;

FIG. 41 is an image display screen of case (3), where the video range and the display-not-permitted range overlap as illustrated;

FIG. 42 is an explanatory view for calculating a portion of an image on which a black image is to be overlaid in the case (1);

DETAILED DESCRIPTION OF THE PREFERRED EMBODIMENTS

Preferred embodiments of the present invention will be described in detail in accordance with the accompanying drawings.

Figure 1:
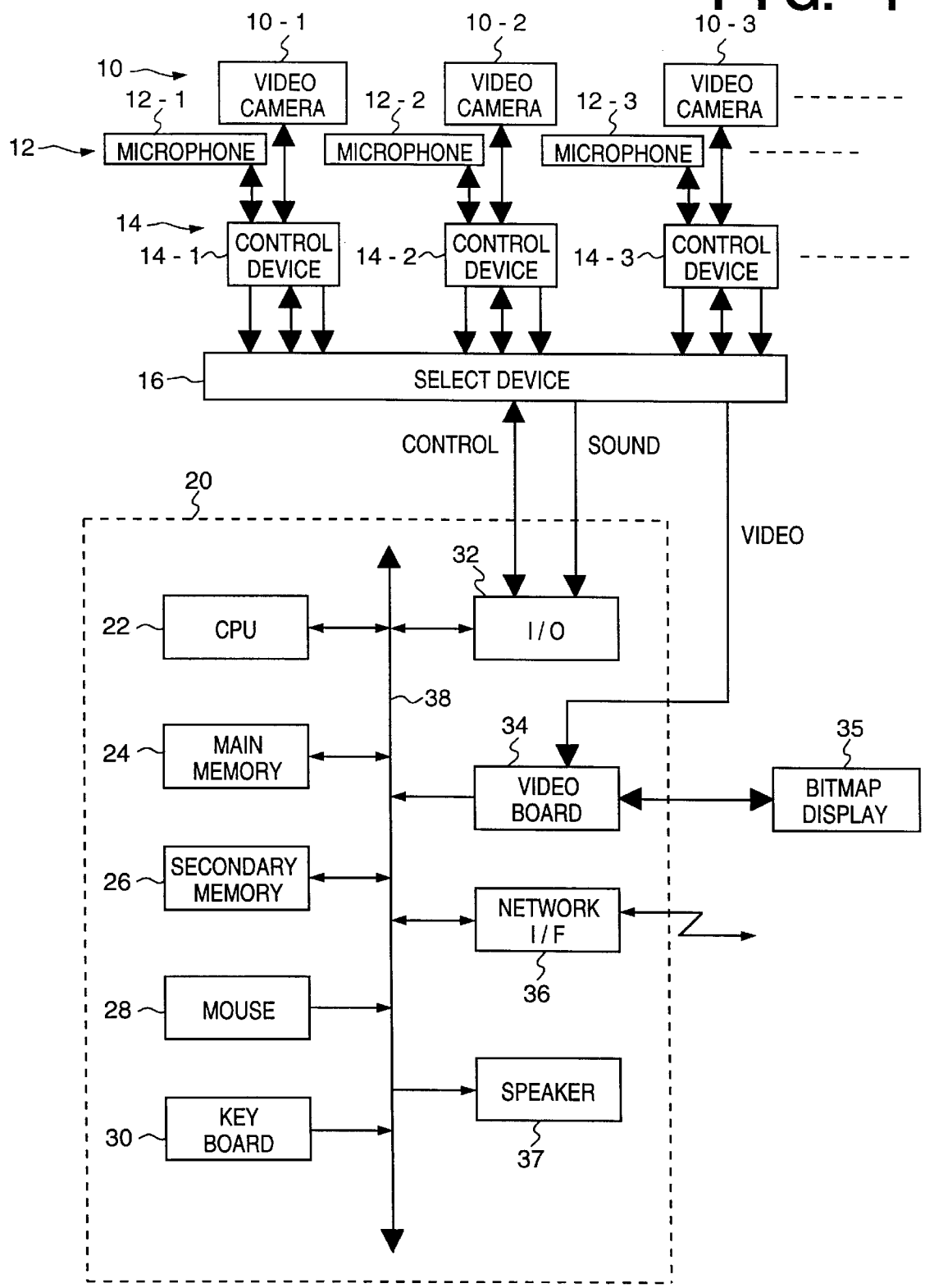
FIG. 1 is a block diagram showing a computer system as the first embodiment of the present invention.

FIG. 1 is a block diagram of a computer system to which an image communication apparatus serving as a basic element of the first embodiment is connected, that is, a plurality of cameras and microphones. One or more of the computers having a configuration shown in FIG. 1, or one or more of computers similar to the aforementioned computers are connected to one another via a computer network.

In FIG. 1, reference numeral 10 (10-1, 10-2, 10-3, . . . ) denotes a video camera; 12 (12-1, 12-2, 12-3, . . . ), a microphone substantially attached to the respective video camera 10; 14 (14-1, 14-2, 14-3, . . . ), a control device which directly controls pan, tilt, zoom, focus and diaphragm or the like of the video camera 10 (10-1, 10-2, 10-3, . . . ) as well as sound input of the microphone 12 (12-1, 12-2, 12-3, . . . ) in accordance with an external control signal; and 16, a select device which selects which of the video camera 10 (and microphone 12) is to be controlled and which of the output signal (image signal and sound signal) is to be captured. For an interface, RS-232C or the like is given as an example; however, the present invention is not limited to this.

Reference numeral 20 denotes a control terminal or a computer which controls the video camera 10 and microphone 12 connected to the control device 14, by controlling the select device 16 to send a control command to a desired control device 14 via the select device 16. At least one of the camera 10 is placed near the terminal 20.

Reference numeral 22 denotes a CPU which controls the entire control terminal 20; 24, a main memory; 26, a secondary memory device (e.g. hard disk); 28, a mouse serving as a pointing device; and 30, a keyboard. Reference numeral 32 denotes an I/O port which is connected to the select device 16, supplies a control command or the like to the select device 16, and captures a sound signal outputted from the microphone 12 attached to the camera 10 that is selected by the select device 16. Reference numeral 34 denotes a video board for displaying various images on a bitmap display 35 in addition to capturing an image signal outputted from the video camera 10 selected by the select device 16. Reference numeral 36 denotes a network interface which connects the control terminal 20 with a computer network or a communication-line network; 37, a speaker; and 38, a system bus which mutually connects the devices 22 to 34, network interface 36 and speaker 37.

Other terminals on the network can control (image/sound transmission and remote operation of a camera) an arbitrary camera 10 (and microphone 12) by sending a control signal from a remote location to the control terminal 20 via a network by the network interface 36.

The select device 16 selects one of the plurality of control devices 14, supplies a video output and a sound output from the selected control device 14 to the video board 34 and I/O port 32 respectively, and logically connects a control signal line connected to the selected control device 14 with the I/O port 32. As a form of a video signal, an NTSC composite signal or an NTSC signal, which adopts a method of luminance and color difference separation, can be given as an example. The video board 34 captures a video signal outputted from the video camera 10 selected by the select device 16. The captured video signal is displayed as a moving-picture in a predetermined window of the bitmap display 35, alternatively transmitted to another terminal. Inputted sound is captured into the main memory 24 via the I/O port 32 and the system bus 38, and outputted as sound to the speaker 37, alternatively transmitted to another terminal.

In the secondary memory 26, initial setting data of the camera 10 (and microphone), and initial setting data and management data related to an access privilege are stored. These data will be described later in detail.

When only one of the camera 10 (and microphone 12) is connected, the select device 16 is not necessary; thus the control device 14 is directly connected to the I/O port 32. If no sound is inputted, the microphone 12 is unnecessary. If neither an image nor sound is inputted, the camera 10, microphone 12, control device 14 and select device 16 are unnecessary. Naturally, in this case, the apparatus serves as a device which only receives and reproduces an image and/or sound transmitted from another terminal including the camera 10.

Figure 2:
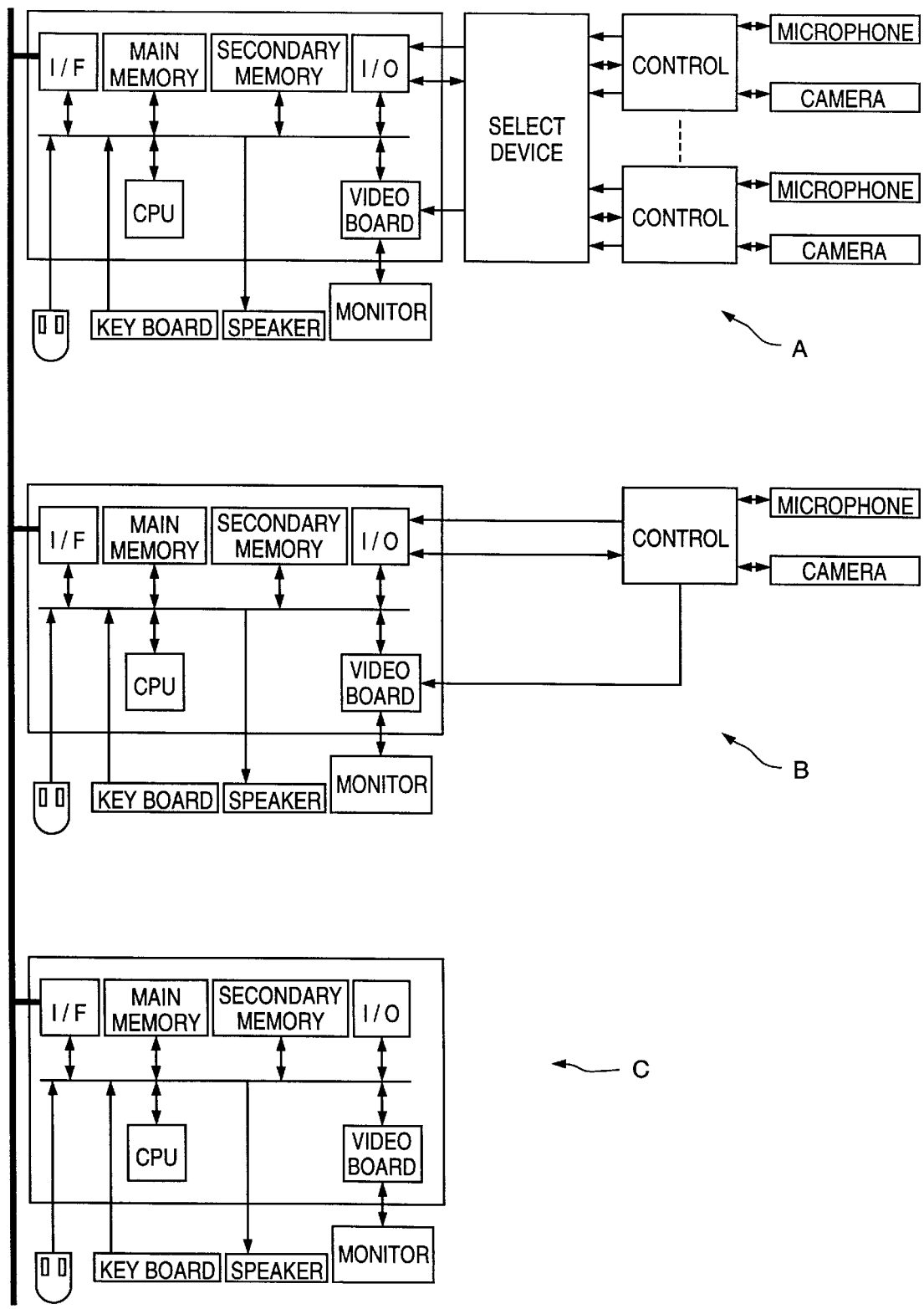
FIG. 2 is a block diagram of a hardware structure of the present embodiment in a network.

The apparatus shown in FIG. 1 is, for instance, connected to a network as illustrated in FIG. 2. A terminal A has a configuration identical to that shown in FIG. 1, while a terminal B has a configuration where the control device 14 is directly connected to the I/O port 32 since only one of the camera 10 and the microphone 12 are connected. A terminal C has a configuration where the camera 10 and microphone 12 are not connected. Generally, terminals such as those terminals A, B and C having various configurations exist in one network.

Note that the network used in the present invention is assumed to be a LAN or a WAN having a transmission band-width large enough to transmit digital moving-picture data, digital sound data and remote control signals. The moving-picture data and sound data is compressed for transmission in accordance with an existing compression encoding method. The compression and decompression processing will not be described herein since the processing does not directly relates to the present invention. If a sufficient transmission capacity is secured, such data compression is unnecessary.

The video board 34 includes a video signal capturing function as described above. Captured video data is supplied not only to the bitmap display 35 to be displayed as an image, but also to the CPU 22 via the bus 38. Sound data from the selected microphone is also supplied to the CPU 22 via the I/O port 32 and bus 38. The CPU 22 makes the video data and sound data into packets and outputs them to a network via the network interface 36. From the network interface 36 to the network, control commands including a camera-operate instruction and a camera-switch instruction are also made into a packet and transmitted. In addition, information related to the entire system is made into a packet and outputted to the network. The above data is transmitted to a specified transferring destination or all the terminals depending on a content or necessity of the transmitting data.

The above described description applies to reception of data. More specifically, when the packet of video data and sound data as well as the camera-operate instruction and the camera-switch instruction are received, each of the terminals A, B and C handles the received video data and sound data in the similar manner as data inputted directly from a camera and a microphone. The received camera-operate instruction and the camera-switch instruction are handled in the same manner as an instruction sent internally. The information related to the entire system is utilized for updating a system display of a user interface which will be described later.

Figure 3:
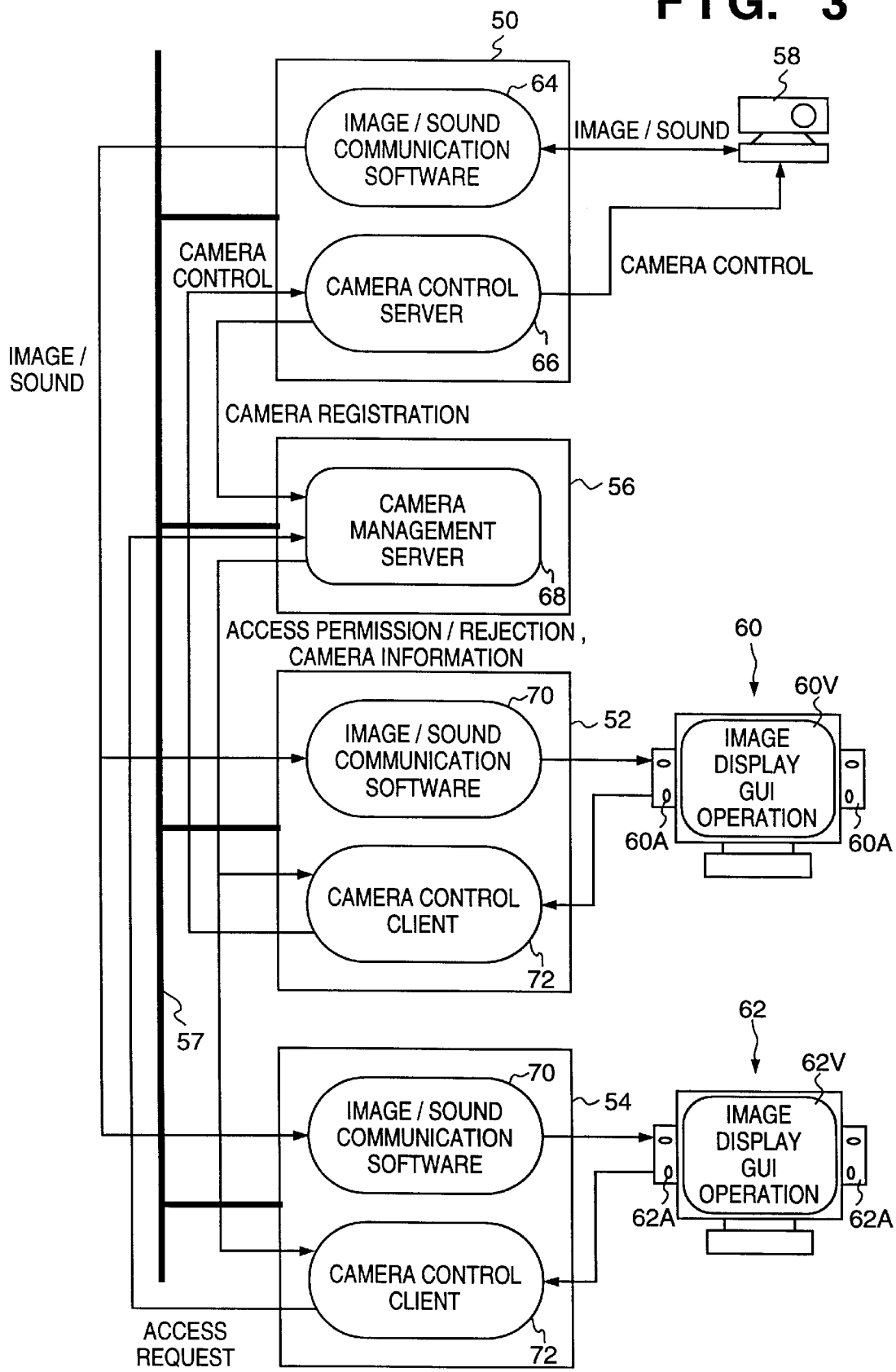
FIG. 3 is a block diagram of a software structure of the present embodiment in the network.

FIG. 3 shows a software structure according to the present embodiment. In FIG. 3, with respect to camera operation, a software installed in a terminal (server) to which a camera apparatus is directly connected and a software installed in a terminal (client) which is operated at the time of remote controlling the camera apparatus are separately shown. In a normal form of application, both software are installed in one terminal, as a matter of course.

Referring to FIG. 3, workstations 50, 52, 54 and 56 are connected to a network 57. In the workstation 50, a camera apparatus 58 including a microphone which respectively corresponds to the camera 10 and microphone 12 is connected. In each of the workstations 52 and 54, image/sound output apparatuses 60 and 62, which integrally comprise monitors 60V, 62V and speakers 60A and 62A respectively, are connected. The workstation 56 manages cameras capable of being controlled by remote operation via a network, and also manages a privilege and an access condition of each user in one network.

The workstation 50 stores an image/sound communication software 64 used for transmitting image and sound data obtained by the camera apparatus 58, including a microphone, to other workstations 52 and 54 via the network 57, and a camera control server (software) 66 used for controlling the camera apparatus 58, including a microphone, in accordance with a camera control signal from the workstations 52 and 54.

In the workstation 56, a camera management server (software) 68 is installed. The camera management server 68 manages all the camera apparatuses connected to the network 57. Note that the camera management server 68 is not installed in a special apparatus, but is stored in any one of the terminals e.g., a personal computer or the like, which are connected to the network 57.

The camera control server 66 reads, at start-up time, initial setting data of all the camera apparatuses 58, including a microphone, connected to the network and informs the names of all the camera apparatuses 58 and their initial conditions (a setting location, an initial direction and a zoom value) to the camera management server 68. In accordance with a registration request from the camera control server 66, the camera management server 68 registers with a camera list that the camera apparatus 58 in the workstation 50 is available for use via the network 57.

The workstations 52 and 54 store image/sound communication software 70 used for receiving image and sound data from the workstation 50 and outputting the data to the image/sound output apparatuses 60 and 62, and a camera control client (software) 72 including GUI (Graphical User Interface) used for performing user verification, image display, sound output, camera operation and setting of an access privilege. The camera control client 72 performs user verification at start-up time, and displays information such as a list of available cameras and access conditions of other users or the like. The camera control client 72 also updates the displayed information in real-time in accordance with the information transmitted from the camera management server 68. In addition, the camera control client 72 performs, for a user, the setting of an access privilege with respect to its camera.

Upon user verification by the camera control client 72, a user of the workstations 52 and 54 is able to refer to, or write to, or correct various data managed by the camera control server 68 within a permitted range of the access privilege. Detailed description thereof will be provided later. When remote operation of a camera (herein, the camera apparatus 58) of another workstation is permitted by the camera management server 68, the camera control client 72 is able to transmit a camera control signal to another workstation (herein, the camera control server 66) without going through the camera management server 68.

In the normal operation, both the image/sound output apparatus and the camera apparatus, including a microphone (if sound is not transmitted, a monitor display and a camera only), are connected to each workstation. Thus, the image/sound communication software 64 and 70 naturally include both the functions for sending and receiving an image and sound. Generally, a software consists of a single program or a group of program modules. The terminal A shown in FIG. 2 corresponds to the workstation 50 in FIG. 3, the terminal C in FIG. 2 corresponds to the workstation 52 or 54. The terminal B in FIG. 2 corresponds to the workstation 52 or 54. The workstation 56 in FIG. 3 corresponds to any of the terminals A, B or C in FIG. 2.

The camera management server 68 is a software which manages all the camera apparatuses (and microphone) connected to the network 57. More specifically, the camera management server 68 stores information such as names of all the cameras connected to the network 57, names of the host, setting locations, directions, access conditions and access privileges or the like. The camera management server 68 manages access permission/rejection in response to a camera access request sent by a user, in addition to the register process necessary for a camera to connect with the network 57 and the deleting process necessary to be disconnected with the network 57. The camera management server 68 also informs all the camera control client 72 via the network 57, of the various information related to the cameras connected to the network 57 on a regular basis or upon a request.

Figure 4:
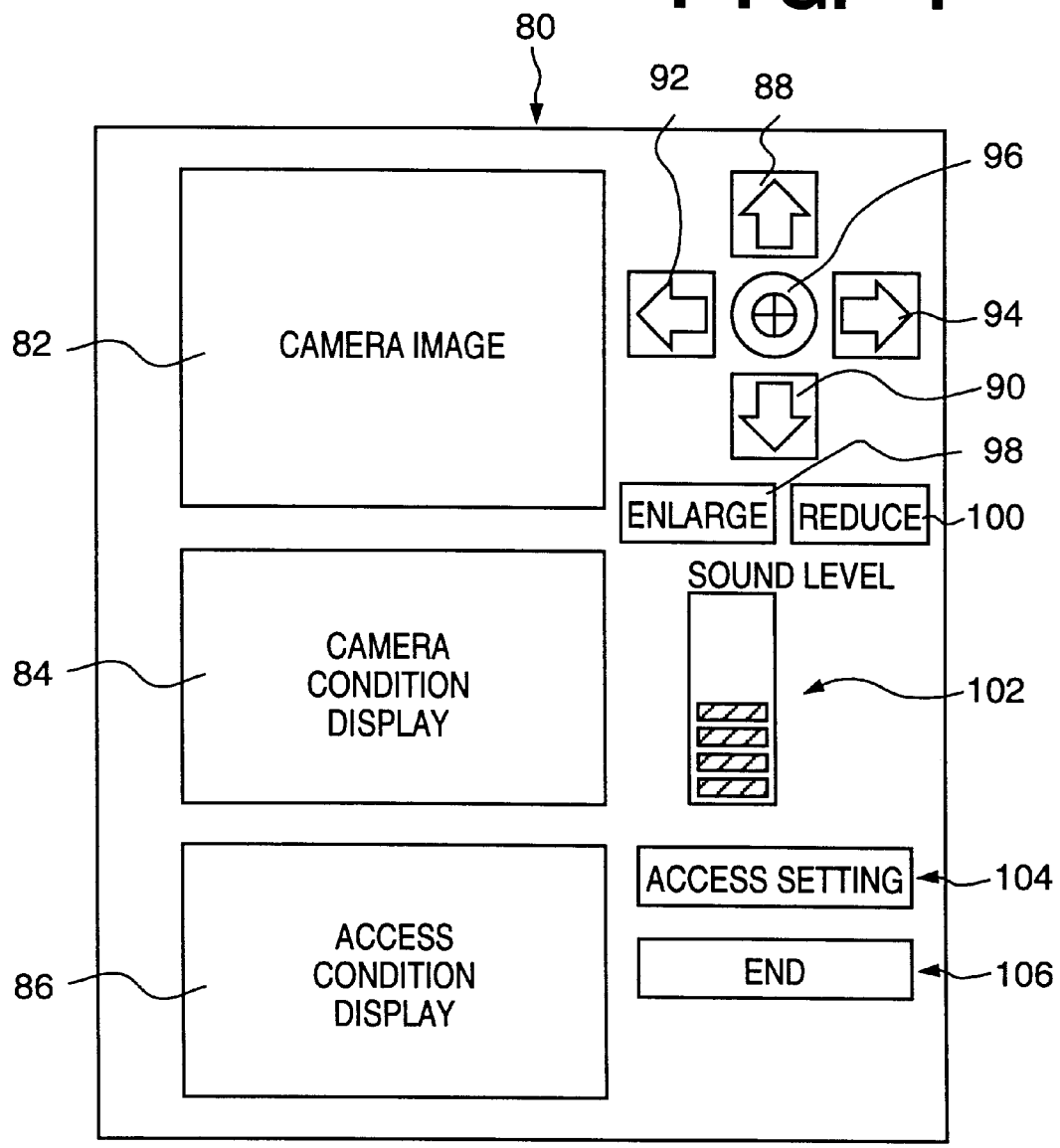
FIG. 4 is an example of a display screen of a camera control client 72.

FIG. 4 shows an example of an image display operation screen displayed on the bitmap display 35 by using the camera control client 72. On the bitmap display 35, a window system capable of simultaneous displaying of multiple windows is assumed to be running. An image display operation window 80 includes an image display section 82 which displays an image taken by a camera, a camera condition display section 84 which displays condition of the camera, an access condition display section 86 which displays access condition, camera control buttons 88 to 100 for controlling panning, tilting and zooming, a sound level display section 102 which displays a sound level, an access setting button 104 and end button 106.

In the camera condition display section 84, a camera-condition table as shown in FIG. 5 is displayed. Displayed information relates to all the cameras connected to the network 57 and includes names of the cameras, host names of terminals to which each of the cameras is connected, panning/tilting angles, zooming, owners, access conditions and the like. The name of the camera indicates a specific name which identifies each camera; and the panning and tilting angles, image sensing directions of each camera. The owner is the user who possesses the right to set an access privilege of the camera, and normally who uses the terminal directly connected to the camera. When no one is remote-controlling the camera, the access condition shows a blank field (not used). Hereinafter, the information displayed in the camera condition display section 84 will be referred to as a camera list.

The access condition display section 86 displays a user name who receives an image and sound outputted from a camera which is connected to the terminal showing the display 86, and a user name who performs remote-controlling of the camera connected to the terminal showing the display 86.

The camera control buttons 88 to 100 consists of tilt buttons 88 and 90 for vertically moving a camera, pan buttons 92 and 94 for laterally moving the camera, a home position button 96 for instructing the camera to return to a home position, a zoom-up (enlarge) button 98 and zoom-down (reduce) button 100.

The sound level display section 102 indicates the sound level of speaker output.

For instance, in a case where a user desires to access (remote operation or reception of an image/sound) an arbitrary camera connected to another arbitrary terminal, the user double-clicks the corresponding field in the camera list displayed in the camera condition display section 84. The camera control client 72 then sends a request to access the selected camera to the camera management server 68. The camera management server 68 takes into consideration how an access privilege is set (described later in detail) and determines permission/rejection of the access (reception of an image/sound and camera control), informing the result to the camera control client 72 who requested the access. When the access is permitted, the camera control client 72 becomes possible to access the designated camera. Upon permission of image reception, an image taken by the camera is displayed on the image display section 82, and upon permission of sound reception, the sound from a microphone attached to the camera is outputted from the speaker. Upon permission of camera control, the direction and zooming of the camera can be remotely operated with the camera control buttons 88 to 100.

Descriptions will be provided on a setting method of an access privilege according to the present embodiment. A concept of the access privilege is described first. In the present embodiment, the access privilege is set for a person (user), and a log-in name predeterminedly registered in the system is used to recognize a person. In the present embodiment, the access privilege can be set with respect to image reception, sound reception and camera control. The access privilege regarding the image reception and sound reception is set by a user who possesses the right to manage the camera. The setting is related to whether to permit other users to receive image/sound taken by the camera. Similarly, setting of the access privilege regarding camera control is related to whether or not the user having the right to manage a camera permits other users to perform camera control such as panning, tilting and zooming of the camera. In the present embodiment, with respect to the camera control, a "partially permitted" mode can be set in addition to a "permitted" mode and a "rejected" mode. In the "partially permitted" mode, the range of camera control such as panning, tilting and zooming is limited, and camera control within the limited range is allowed.

Although the access privilege regarding sound reception and access privilege regarding image reception can be set separately, setting of the access privilege regarding image reception is dependent upon the setting of the access privilege regarding camera control. More specifically, a user can receive sound only, or an image only, or receive both sound and an image, however cannot perform camera control without receiving an image. To have camera control, image reception must be permitted. In other words, when camera control is permitted, image reception is always permitted.

According to the present embodiment, a user is classified into three types of users: a system administrator, a camera owner and a general user. The system administrator is a so-called super user, and possesses the right to set or change access privileges of all the cameras. The camera owner has the right to set or change an access privilege of his/her own camera. The general user is a user who is not a system administrator, and who attempts to access a camera possessed by another person.

As a camera owner, there are: a person who has initialized the camera (hereinafter referred to as an "initial-user"), and a person who is currently using the terminal connected to the camera (hereinafter referred to as a log-in user, since he/she may be logged in the terminal only temporarily). An initial-user and a log-in user are not the same person in general. It is preferable for a log-in user to have the right to set or change an access privilege for, at least, a camera which is set closest to the logged-in terminal and which can take pictures of him/her self.

In the present embodiment, the following rule is adopted as a method of determining a camera owner. That is, although a camera owner is the "initial-user" in one way, if there is a log-in user, the log-in user becomes the camera owner.

What is most important in terms of limiting transmission of an image/sound is the limitation of an access privilege set by a camera owner for general users. FIG. 6 shows an example of setting an access privilege. Contents of the table in FIG. 6 show access privileges which are set by a camera owner for general users 1 to n. Sound reception, image reception and camera control are permitted or not permitted for each of the general users 1 to n. In a case where camera control is partially permitted (e.g., user 2), a table defining a permitted range (or not-permitted range) is separately prepared and linked to the table in FIG. 6.

User 1 and user 3 have the same contents of an access privilege in FIG. 6. In the method where access privileges are controlled for each user, as the number of the general users increases, managing the users becomes complicated. In that case, it is convenient if users whose access privileges are the same are bundled in one user group, and the access privilege is set or changed by the group. By bundling users into a user group, setting and changing of an access privilege having the same contents is easily realized. An example of setting an access privilege for the user group is shown in FIGS. 7A and 7B. In FIG. 7A, users who have the same contents of an access privilege in FIG. 6 are bundled in a same group.

Depending on the situation of a camera owner, he/she may sometimes desire to dynamically change an access privilege, such as when a camera owner wants to concentrate on his/her work, use the camera by himself, or make full use of the capability of the terminal. In the present embodiment, a camera owner can dynamically change, in other words, limit the access privilege of general users despite the access privilege set for each of the general users.

However, it is time consuming to dynamically change access privileges of all user groups. In view of this, plural access modes whose contents of an access privilege are different are established. By virtue of this, contents of an access privilege can be easily changed by switching the plural access modes depending on the situation. Examples of the access modes are shown in FIG. 8.

In FIG. 8, three access modes: open, normal and close are established. In the open mode shown in FIG. 8A, sound reception, image reception and camera control are permitted to groups 1 and 2, and the camera control is not permitted to other groups. In the normal mode shown in FIG. 8B, sound reception, image reception and camera control are permitted to group 1, sound reception and image reception are permitted to group 2, and none of the sound reception, image reception and camera control is permitted to other groups. In the closed model shown in FIG. 8C, only the image reception is permitted to group 1, and none of the operation is permitted to group 2 and other groups. When one of the modes is selected, the contents of the selected mode are notified to the camera management server 68.

Even if a camera owner utilizes the above described concept of user groups and access modes, it is still cumbersome to perform the setting from the very beginning every time the camera control system is started. Therefore, normally, as widely known, the setting of each user or each user group is stored in an access privilege setting file, and an access privilege is automatically set at the start-up time by referring to the file. The contents of the access privilege is automatically saved when terminating the system use.

When the system is started for the first time, there is a case where the access privilege setting file does not exist. In that case, the system sets a default value representing predetermined contents. A camera owner may change the default setting contents as necessary. For instance, assuming that the contents shown in FIG. 7 is a default setting mode. After starting-up the system, each user may be assigned with the group 1, group 2 or other groups, thereby generating new user groups.

There are cameras which do not need to set an access privilege such as those cameras set on a hallway or a public place or the like. In these cameras, access is permitted to all users. For such case, a "private" mode for setting an access privilege and a "public" mode for not setting an access privilege are established.

Generally, an access privilege is set for each camera. However, in a case where one user owns a plurality of cameras and desires to set the same setting contents for some of the plurality of cameras, these cameras are defined as a camera group so that the same access privilege is set. Such function for defining a camera group is established in a GUI (Graphical User interface) which is used for setting an access privilege.

Next, detailed descriptions are provided for setting and changing of an access privilege according to the present invention. In the software structure shown in FIG. 3, camera control server 66 and camera management server 68 cooperate to manage the access privilege and control accesses. In other words, the camera management server 68 manages information in the entire system such as an access condition of each camera and setting of an access privilege or the like. In accordance with the set access privilege, the camera management server 68 permits or rejects an access request for transmitting sound and/or an image or camera control. In a case where a user attempts to access a camera whose control ranges of camera parameters e.g. panning, tilting, zooming or the like are limited, the camera control server 66 rejects a camera control request which exceeds the permitted range of control.

The basic structure of access privilege control according to the present invention will be described in detail, with respect to system start-up, sending of an access request and setting of an access privilege.

Figure 9:
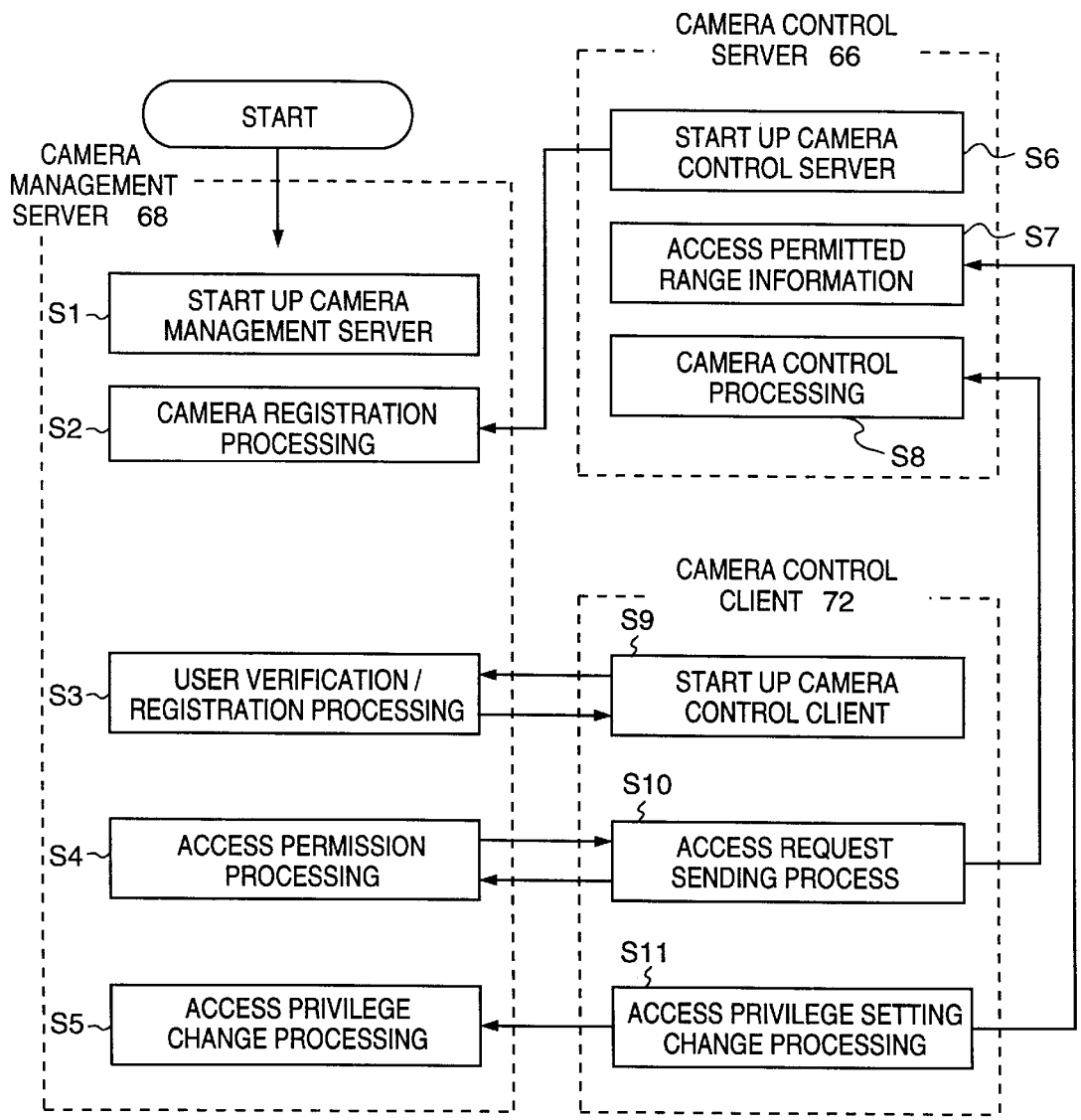
FIG. 9 is a block diagram showing the steps of start-up, access request and access setting.
Figure 10:
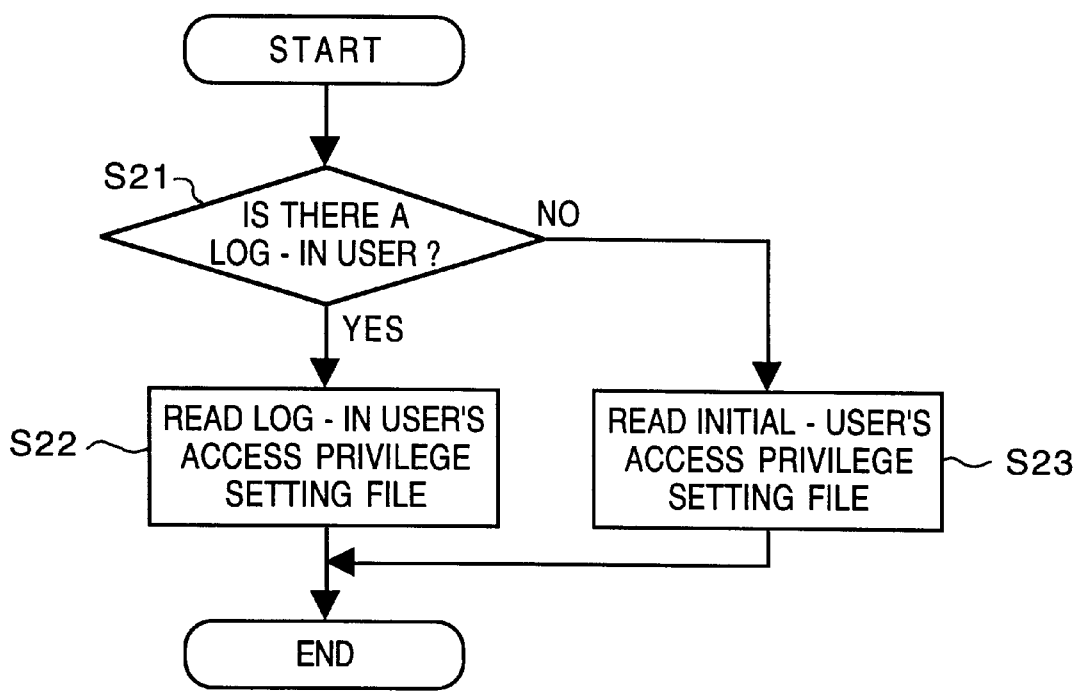
FIG. 10 is a flowchart showing the start-up process of a camera control server 66.
Figure 11:
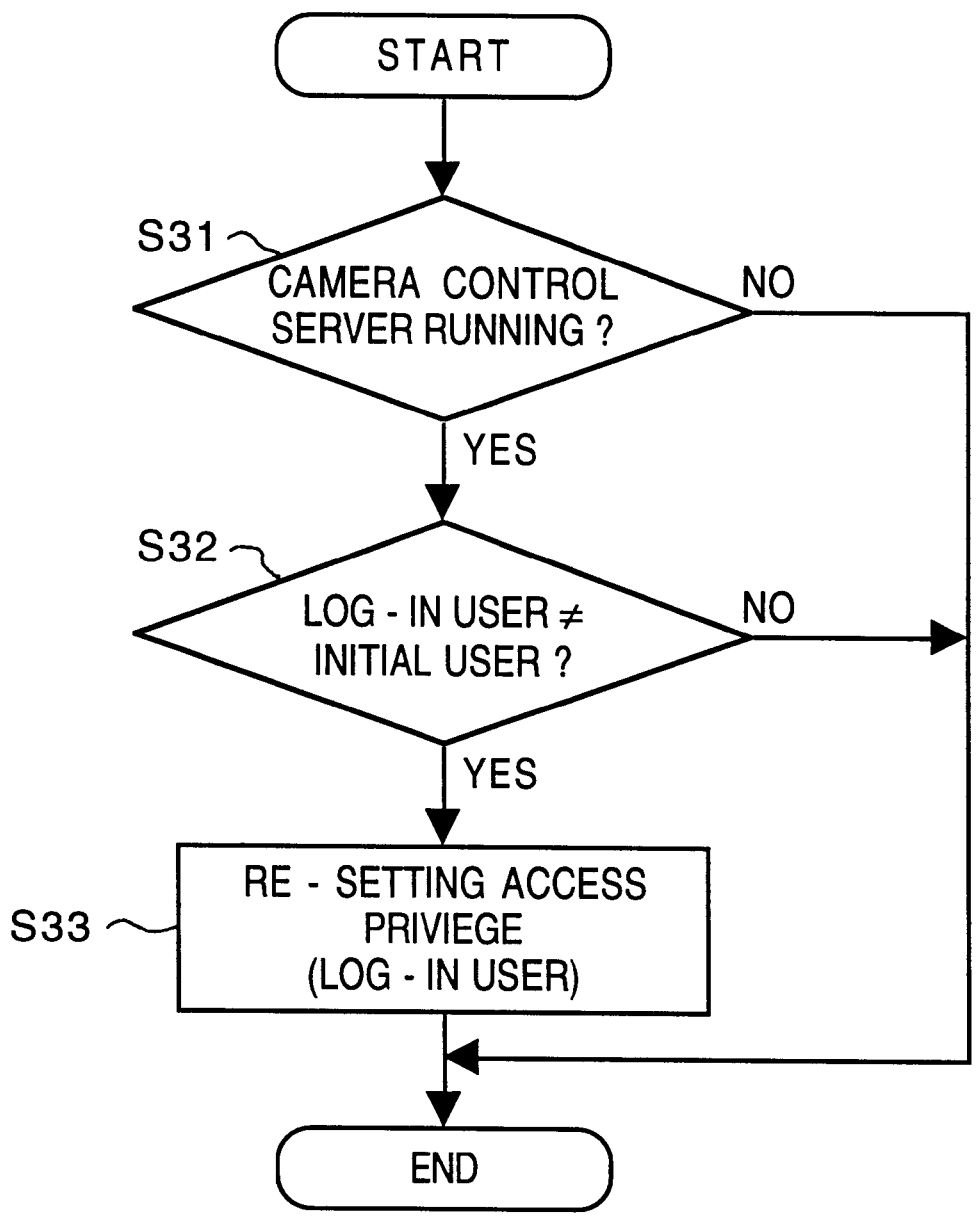
FIG. 11 is a flowchart showing the access setting process of a camera management server 68 in response to a registration request from the camera control client 72.

With reference to FIGS. 9 to 11, the steps of starting-up the camera control server 66, camera management server 68 and camera control client 72 are described. FIG. 9 shows a correlation of the camera control server 66, camera management server 68 and camera control client 72. FIG. 10 is a flowchart showing start-up processing of the camera control server 66; and FIG. 11, a flowchart showing the access setting process of the camera management server 68 in response to a register request from the camera control client 72.

Figure 13:
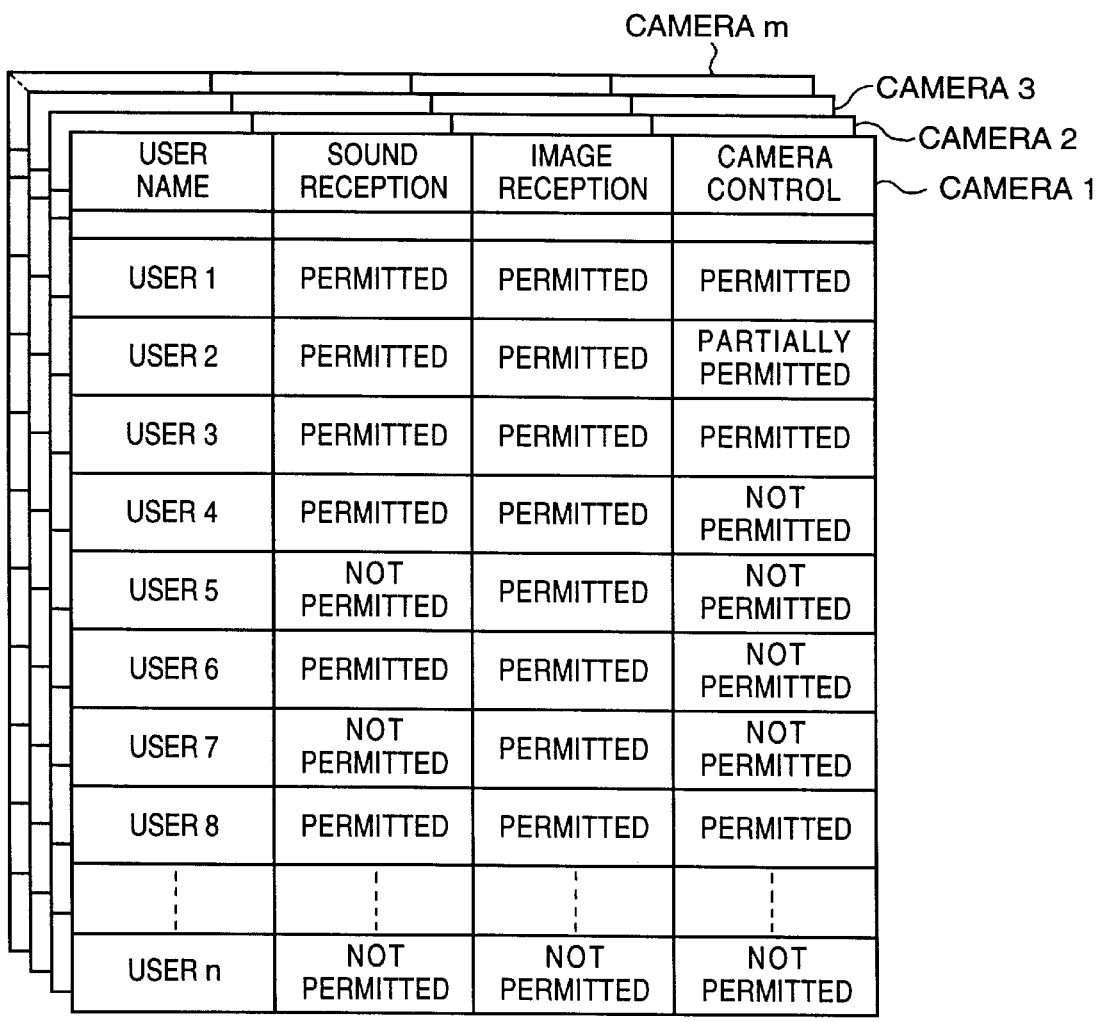
FIG. 13 is an access privilege setting list stored in the camera management server 68.

The camera management server 68 is started prior to all other software (S1). The camera management server 68 stores a camera list such as that shown in FIG. 5, a user list such as that shown in FIG. 12, and an access privilege setting list such as that shown in FIG. 13.

The user list shown in FIG. 12 is prepared as a file in advance and read at the start-up time. The user list includes columns for a user ID, a user name, a password and a priority rank for each user. The user ID is a number uniquely assigned to each user for the purpose of user management. For instance, the number 0 is assigned to a system administrator. The user name is an array of arbitrary characters. For instance, the system administrator is named as "ADMINISTRATOR". The password is a character array for verifying the user. The priority rank is a variable indicating the priority level related to an access privilege of a user, utilized for controlling access privileges which will be described later.

The password should not be seen by anyone except the system administrator. Therefore, the user list file is set such that no one but the system administrator can look at, and further, it is preferable to encrypt the file. The present invention is not limited to a specific encryption algorithm. User registration and password change can be performed by requesting the system administrator to change the user list file.

In the access privilege setting list (FIG. 13), setting conditions of access privileges for all users are recorded with respect to all the cameras which constitute the system. The camera management server 68 also holds a list of log-in users who are running the camera control client 72. Therefore, after starting-up the camera management server 68, the camera management server 68 awaits for connection from a camera server.

Next, the image/sound communication software 64 and 70 are started. At the same time, the camera control server 66 is started (S6). Upon start-up, the camera control server 66 reports the name of a camera, a host name, an "initial-user's" name, and a condition of the camera to the camera management server 68. The camera management server 68 registers the camera information with the camera list and an access privilege is initialized (S2). The camera management server 68 also reports to all the camera control clients 72 connected to the system, that a new camera has been registered.

Assuming the case where a camera is placed near a control terminal as mentioned above, an initial setting of an access privilege varies depending on whether or not there is a log-in user. Whether or not there is a log-in user can be determined by referring to the log-in user list stored by the camera management server 68. As shown in FIG. 10, in a case there is a log-in user (S21), the user's initial setting file is read to set his/her access privilege (S22); and in a case there is a log-in user (S21), an access privilege initial setting file of the "initial-user" is read to set the access privilege (S23).

Figure 14:
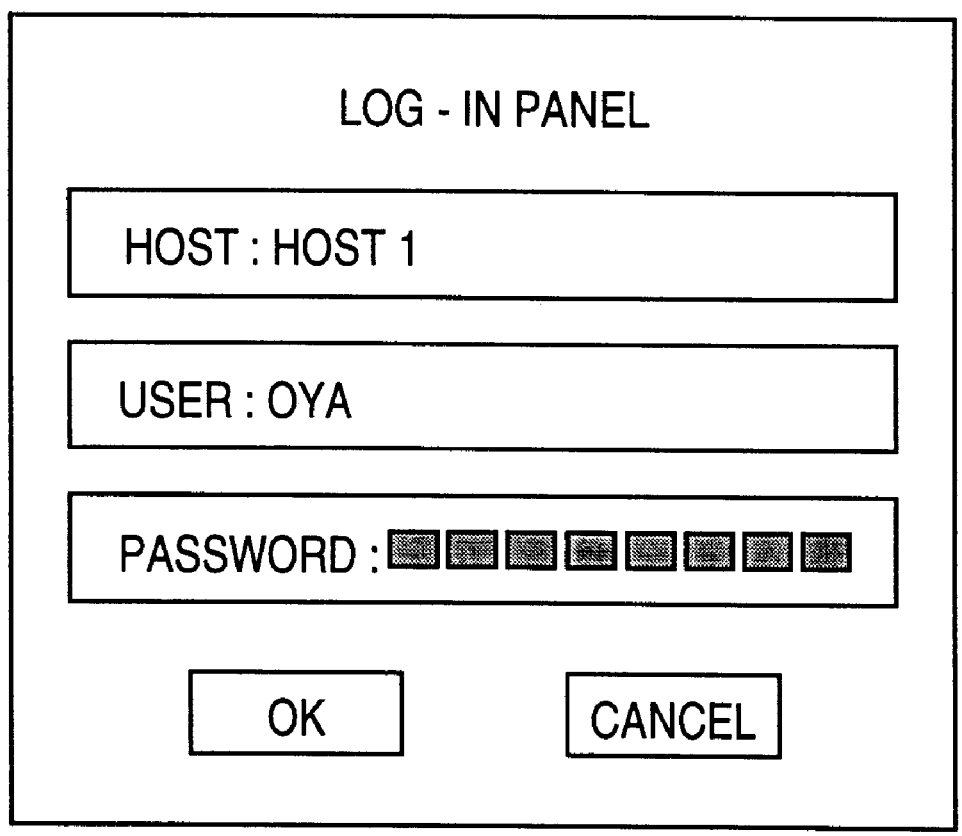
FIG. 14 shows a log-in panel displayed at the time of starting up the camera control client 72.
Figure 15:
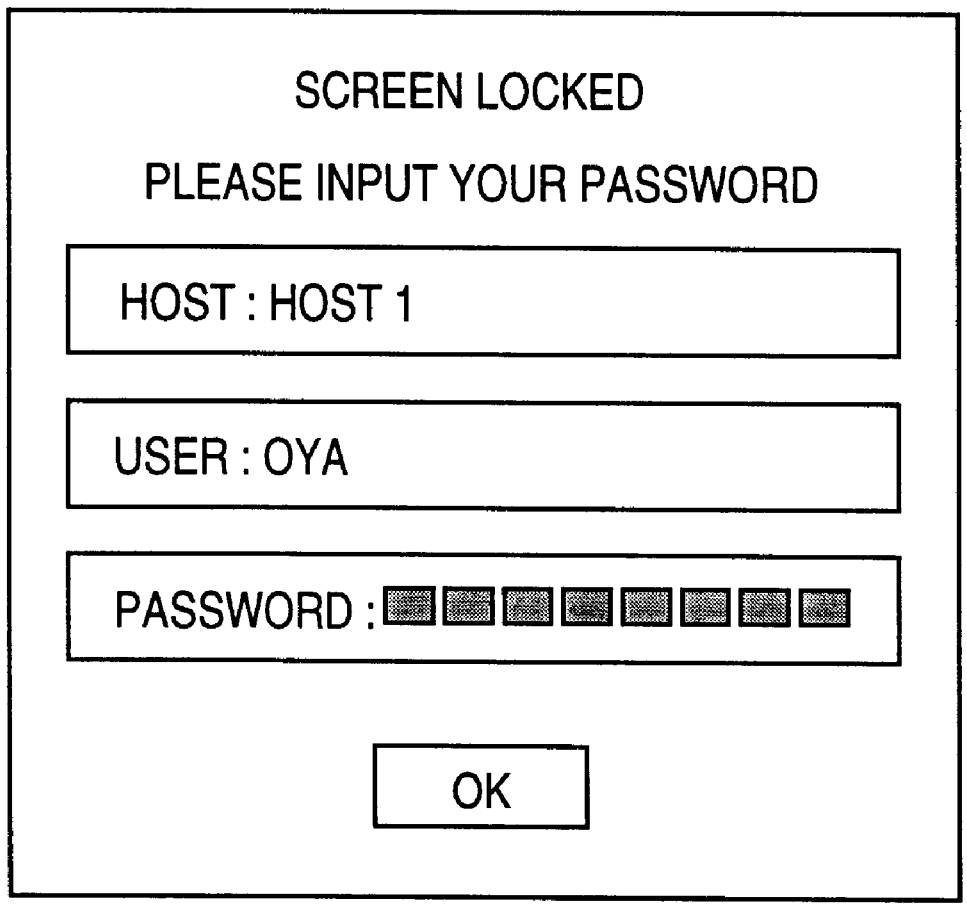
FIG. 15 shows a screen-lock panel displayed by the camera control client 72.

The camera control client 72 is started next (S9). The camera control client 72 first executes user verification processing utilizing a password, immediately after the start-up. The verification process will be described with reference to FIGS. 14, 15 and 16. FIG. 14 shows a log-in panel displayed at the time of starting-up the camera control client 72; FIG. 15, a screen-lock panel displayed by the camera control client 72 for re-verification; and FIG. 16, a flowchart for user verification/screen lock processing.

The camera control client 72 initially displays the log-in panel window as shown in FIG. 14, requesting a user to input a user name and a password (S41, S42). Input data is sent to the camera management server 68 where whether or not the data is correct is determined. If the input data is correct (S43), the access to the system is permitted, and the camera control client 72 performs initial setting (S44), then performs subsequent general processing. If the input data is not correct (S43), the camera control client 72 ends.

In the initial setting (S44), the camera control client 72 performs user registration (S3) with the camera management server 68 and receives system information such as the camera-condition table or the like and displays. Depending on a case, it is necessary to re-set an access privilege as shown in FIG. 11. In a case where the camera control client 72 and the camera control server 66 are run on the same control terminal (S31), the camera management server 68 confirms whether or not the registering log-in user is the same person as the "initial-user" (S32). If the registering log-in user does not match the "initial-user" (S32), the access privilege is changed to that of the log-in user (S33).

Note that at least one camera management server 68 is always run in the system; however, the camera control server 66, image/sound communication software 64 and 70, and camera control client 72 are started as necessary by each terminal. The camera control client 72 receives an image/sound and performs camera control in accordance with the access steps which will be described later. In a case where the user leaves his/her desk for a long time while running the camera control client 72, it is necessary to prevent from being used by other people who are not registered as a user. To realize this, in the present embodiment, if the camera control client 72 is not operated for a predetermined period of time, user verification is performed again as shown in the steps following the steps S45 in FIG. 16.

Figure 16:
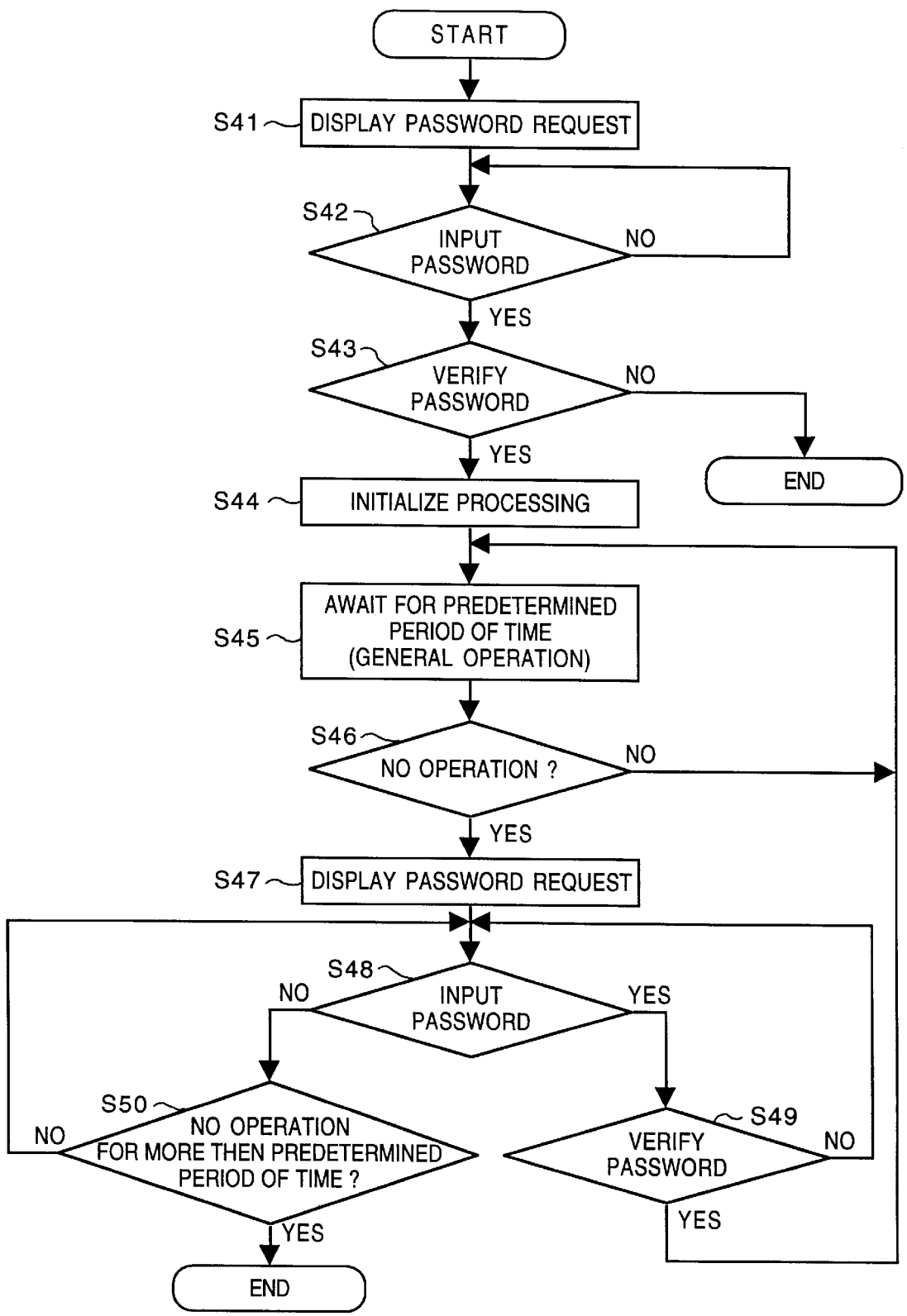
FIG. 16 is a flowchart showing the steps of user verification and screen-lock processing.

The steps following Step S45 in FIG. 16 will be described next. Upon starting the camera control client 72, whether or not any general operation has been performed since the last time the checking is performed is determined at an interval of a predetermined time (S45, S46). If it is determined that there has been no operation, general input from the terminal is temporarily suspended, and the screen-lock panel window as shown in FIG. 15 is displayed to request a password input again (S47).

When a password is inputted (S48), the inputted password is verified (S49), and if it is correct, general input is permitted (S45). If the password is not correct, password input is requested again (S48). It is preferable to limit the number of times of password input to e.g. three times. If no password is inputted for more than a predetermined period of time (S50), the camera control client 72 ends.

Figure 17:
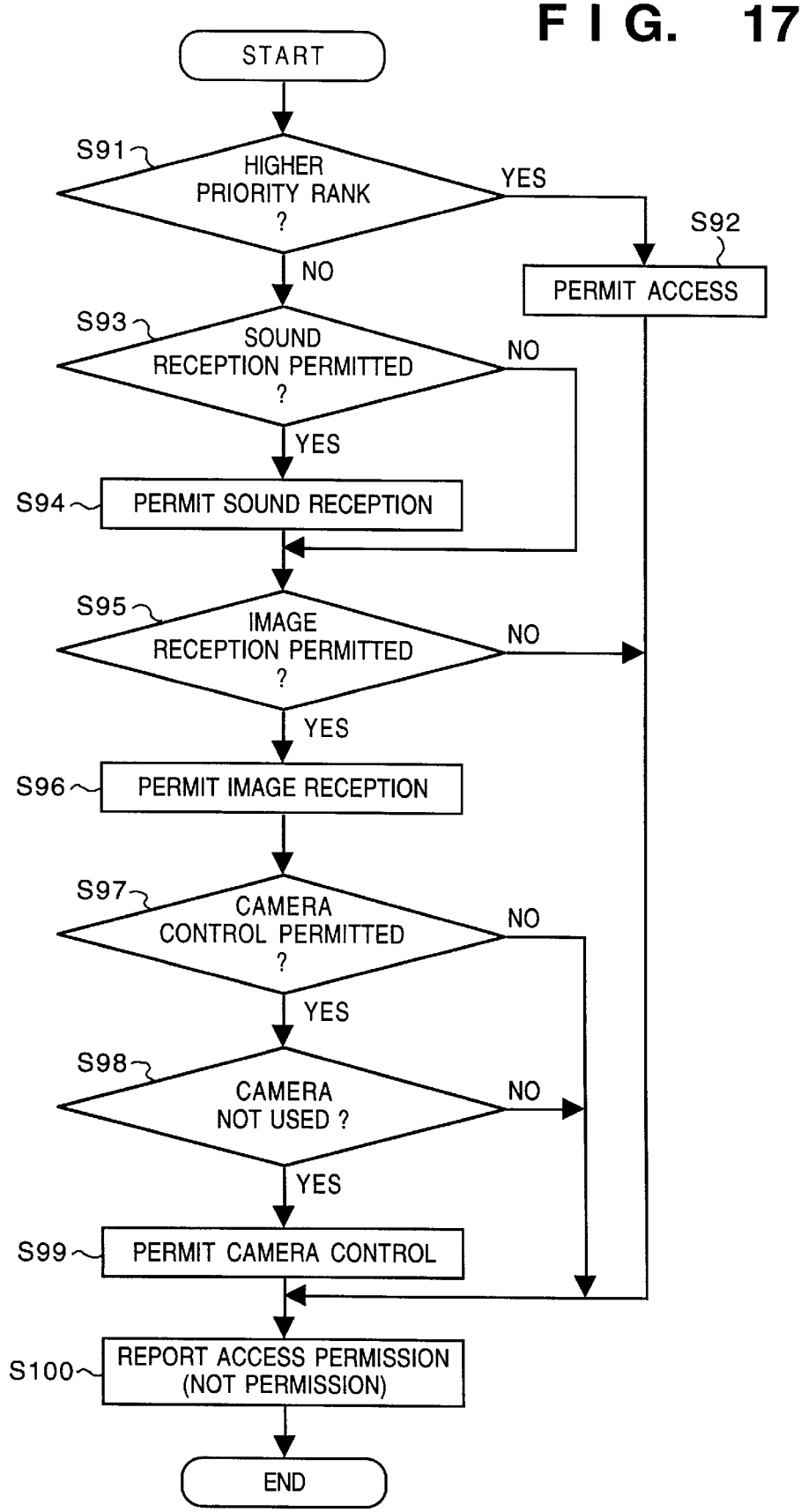
FIG. 17 is a flowchart showing the steps of processing an access privilege.

Next, the accessing steps will be described. The camera control client 72 sends an access request to the camera management server 68 (S10). In response to the access request, the camera management server 68 executes processing shown in FIG. 17. First, a priority rank of the user who is requesting the access and a priority rank of the camera owner whose camera is the subject of the access are compared (S91). A higher priority rank enables an access overriding a previously-set access privilege. The camera control server 68 compares the priority ranks in the user list shown in FIG. 12, and if the priority rank of the user who is requesting the access is higher than that of the camera owner (S91), the access privilege of the camera owner is overridden and general access is permitted to the user requesting the access (S92).

When the priority rank of the user requesting the access is equal to or lower than that of the camera owner (S91), the access permission/rejection is determined in accordance with the set access privilege. More specifically, whether or not the camera control client 72 which sends the access request (or a user) has an access privilege of sound reception regarding the subject camera is determined by referring to the access privilege setting list corresponding to the subject camera shown in FIG. 13 (S93). If the camera control client 72 has the privilege of sound reception, a value indicating sound-receive permission is set in a column of sound reception in a return value (S94). Similarly, whether or not the camera control client 72 which sends the access request has an access privilege of image reception regarding the subject camera is determined (S95), and if it has the access privilege, a value indicating image-receive permission is set in a column of image reception in a return value (S96).

When it is determined that the camera control client 72 has the access privilege of image reception (S95), it is further determined whether or not it has the privilege of camera control (S97). If the camera control client 72 has the privilege of camera control, it is determined if another user is using the subject camera by referring to the camera list (S98). If no other user is using the camera (S98), a value indicating camera-control permission is set in a column of camera control in a return value (S99).

Upon the foregoing processing, the camera management server 68 sends back the return value indicating the result of the access request to the camera control client 72 which has originally sent the access request (S100). At the same time, in a case where an access condition changes, the camera management server 68 reports the change of the access condition to the other camera control clients 72. The camera control client 72 which sends the access request accesses to the subject camera with respect to the permitted items (S10, S8). In a case where camera control is partially permitted to the user, the camera control server 66 allows camera control in the permitted range (S8).

The other camera control client 72 updates display contents of the camera condition display section 84 in accordance with information from the camera management server 68.

The steps of setting an access privilege will be described next. Examples of GUI which is used for setting an access privilege will be shown in FIGS. 18 to 29. The process for setting an access privilege will be shown in the flowchart in FIGS. 30 and 31.

When a setting of an access privilege is to be changed, a subject camera is selected from a camera list in the camera condition display section 84 (FIG. 4) in the image display operation window 80 displayed by the camera control client 72. Then the access setting button 104 is clicked. When the access setting button 104 is clicked, the camera control client 72 communicates with the camera management server 68, and in a case where a user who requests changing of the access privilege is an owner of the subject camera, an access control panel shown in FIG. 18 is opened.

The opened access control panel as shown in FIG. 18 displays a currently-set access privilege condition. When the panel window is displayed for the first time since the system is started, in other words, when no data is set with respect to an access privilege (S51, FIG. 30), the camera control server attempts to read an access privilege description file which is predeterminedly set by a camera owner (S52). However, if the file is not found, the camera is automatically set as a public camera. When the setting of the camera is later changed to "private", the setting for each access privilege mode is set as the table shown in FIG. 8, and all users belong to "other group".

The access control panel shown in FIG. 18 displays a camera name list, a toggle button for selecting public or private, an access-mode change button, an access-privilege set button, an OK button and a cancel button. The OK button completes setting and the cancel button enables to cancel the setting (S53). The camera name list includes members of a camera group to which a designated camera belongs.

Information related to the camera group is stored in the access privilege description file. However, when the file does not exist, setting of the camera group is initialized whereby each group has only one designated camera. Upon displaying the above, the camera control server enters in an event awaiting loop (S54).

Upon designating a camera from the camera name list by double-click operation (S55), a camera information window as shown in FIG. 19 is opened, displaying camera information (S56). In the camera information window, information such as a camera name, a connected host name, a camera owner, a log-in user, and an initial-user or the like is displayed. When a camera delete button is clicked on the camera information window, the designated camera is deleted from the camera group and the camera information window is closed. The deleted camera forms one independent group. Note that it is assumed that a camera group contains at least one camera.

Registration of a camera in a camera group is performed by selecting a desired camera in the camera list displayed in the camera condition display section 84 (FIG. 4), dragging and dropping the selected camera in the camera name list. At the time of adding a camera to a group, camera control client 72 communicates with the camera management server 68 to confirm whether or not the user is the owner of the subject camera. The camera added to the camera group will then have an access privilege setting identical to the setting of the group.

When the above-described operation is completed, the "return to route" button located in the lower corner of the camera information window is depressed. The camera information window is then closed.

For setting an access privilege, whether a camera (camera group) is to be set as "public" or "private" is selected (S57). If it is set as public, the access privilege cannot be limited, as has been explained above, thus all users can freely receive an image/sound of the camera and perform remote control. The section below the access-mode button in the access control panel (FIG. 18) becomes gray so that no input is allowed. In other words, when an event occurs, input in an access-mode menu (S60) and the access-privilege set button is canceled (S59). On the contrary, when the camera is set as private, the section below the access-mode-button in the display screen is changed to a state such that selecting and inputting in the access-mode button and access-privilege set button is possible.

When an access mode is to be changed, the access-mode button shown in FIG. 18 is clicked (S60). The access-mode button is a select button which provides a selection menu. When the button is clicked, selection menu shown in FIG. 20 is displayed and selection can be made from a plurality of predetermined modes (S61).

If more-detailed setting is to be made, the access-privilege set button in FIG. 18 is clicked (S62). An access privilege setting window as shown in FIG. 21 is opened. The access privilege setting window shown in FIG. 21 includes a camera owner display, an access-mode set menu, an access-privilege-display changing section, a cancel button, a default button and an OK button. An access privilege can be set in detail for each access mode, and setting of a user group, adding/deleting of a mode are also possible. When an access-privilege setting window is opened, an access mode is set in the latest mode.

Figure 31:
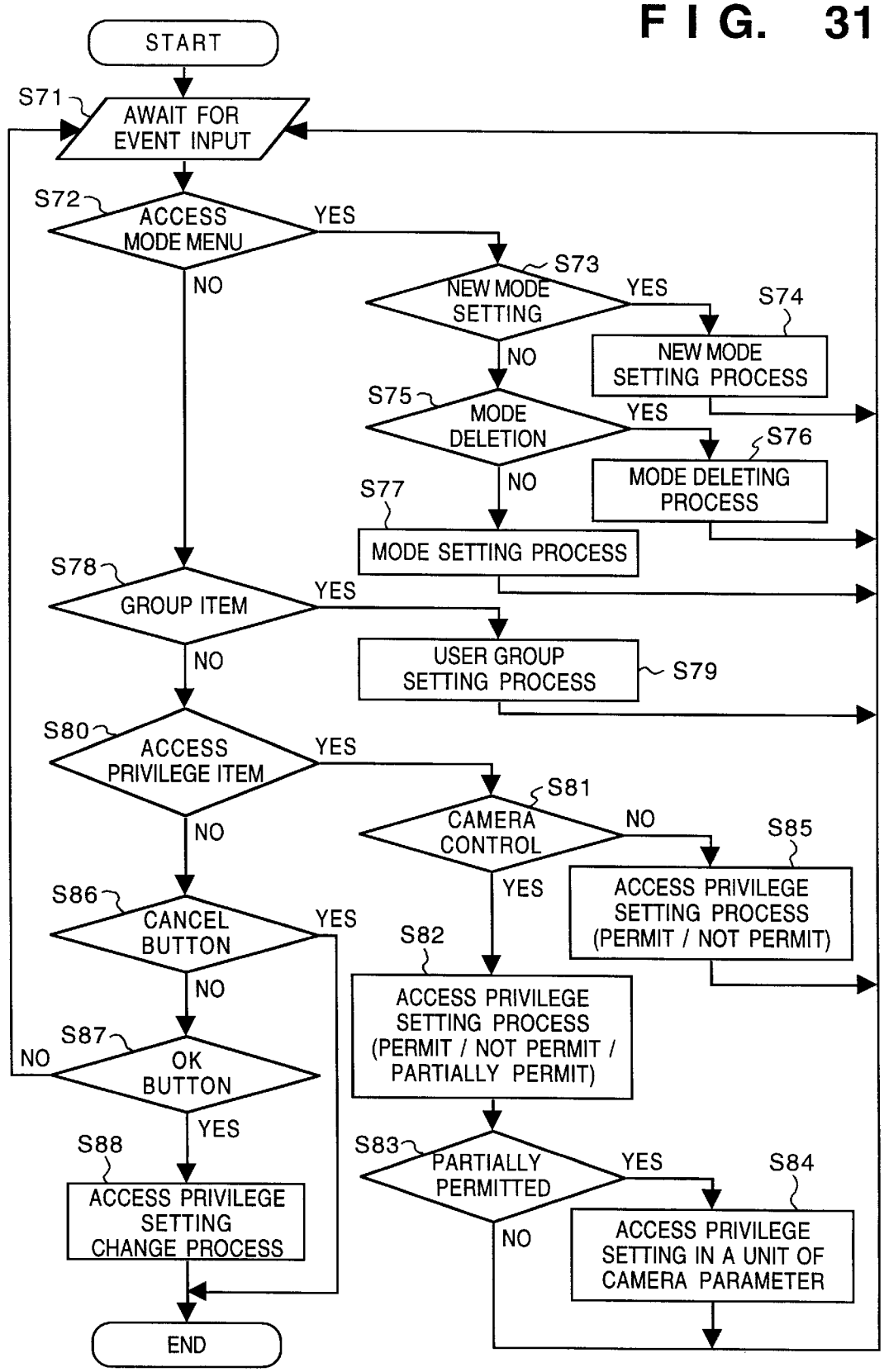
FIG. 31 is a flowchart showing processing related to operation of the access privilege setting window shown in FIG. 21.

FIG. 31 is a flowchart describing in detail the processing performed on the access privilege setting window. On the access privilege setting window shown in FIG. 21, the current camera owner is displayed in the camera-owner display column. When the access-mode set button in FIG. 21 is clicked (S72), the window shown in FIG. 23 is opened. Herein, an access mode can be changed by the operation similar to that used in the selection menu shown in FIG. 20, and adding and deleting an access mode is also possible (S73 to S77). The access-privilege-display changing section in FIG. 21 displays access privileges of the access mode designated in the access-mode set menu. The horizontal columns of the access-privilege-display changing section show access items such as sound, an image, camera control; and the vertical columns, user groups providing access permission.

Figure 26:
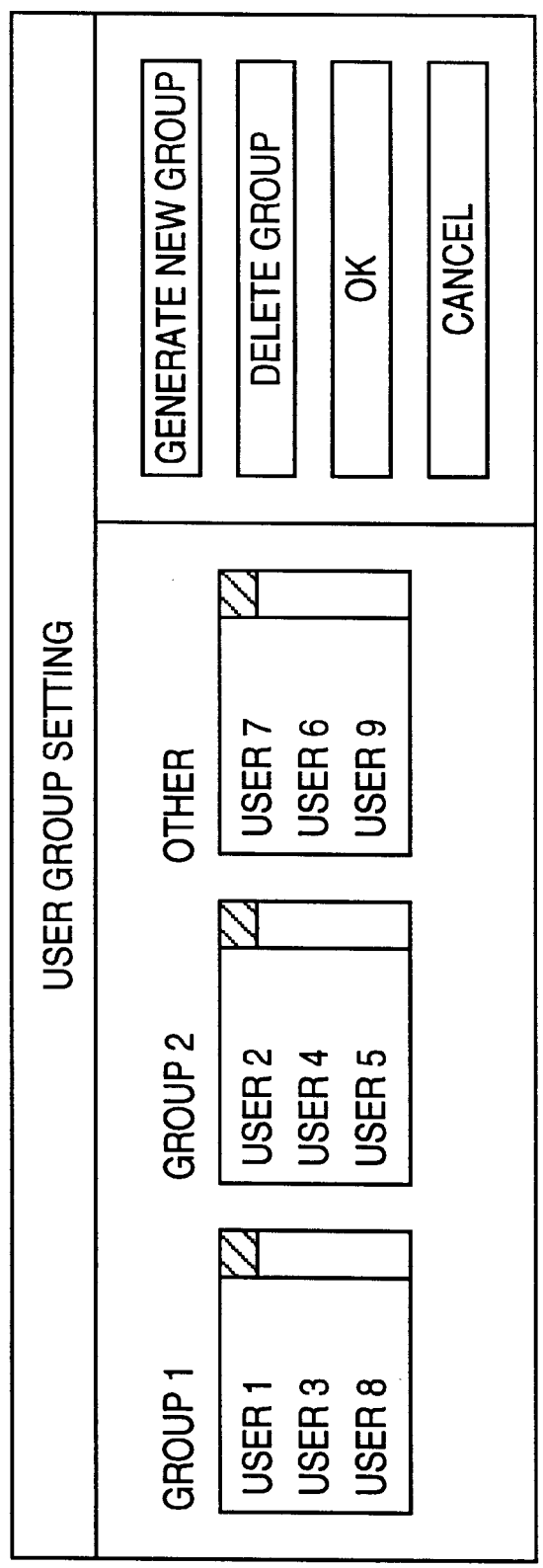
FIG. 26 shows a user group setting window for the access-privilege-display changing section of the access privilege setting window.
Figure 27:
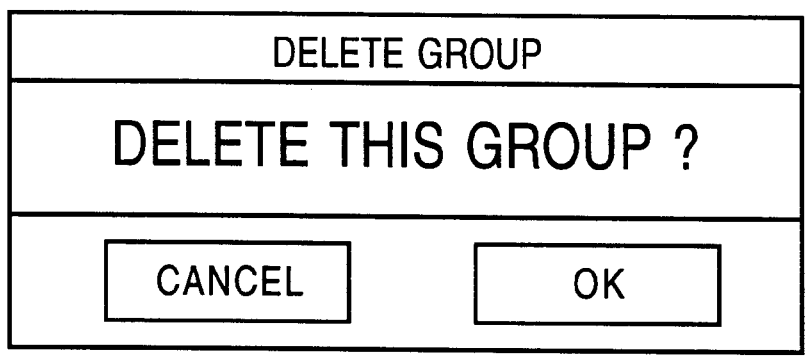
FIG. 27 shows a group deleting window of the window shown in FIG. 26.
Figure 28:
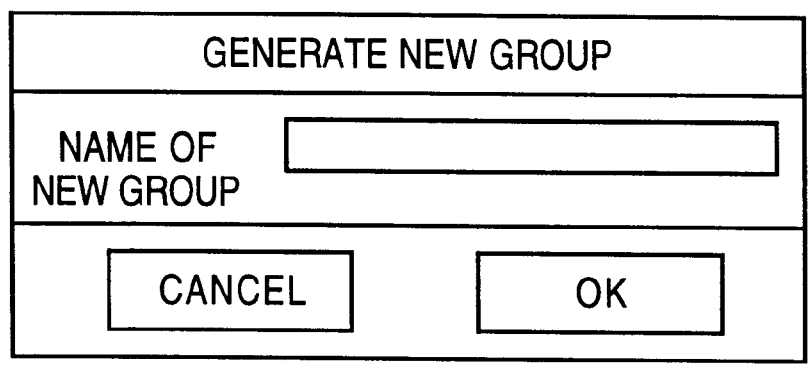
FIG. 28 shows a group generating window of the window show in FIG. 26.

When the column of one user group (e.g. Group 1) in the access-privilege-display changing section in FIG. 21 is clicked, a list of group members as shown in FIG. 26 is displayed (S78). In FIG. 26, if one row indicative of a member who belongs to one group-column is dragged and dropped into another group-column, an arbitrary member can be added or deleted in an arbitrary group. When a new group is to be added, a group-generate button is clicked. When a group is to be deleted, a group to be deleted is selected and a group-delete button is clicked (S79).

Figure 29:
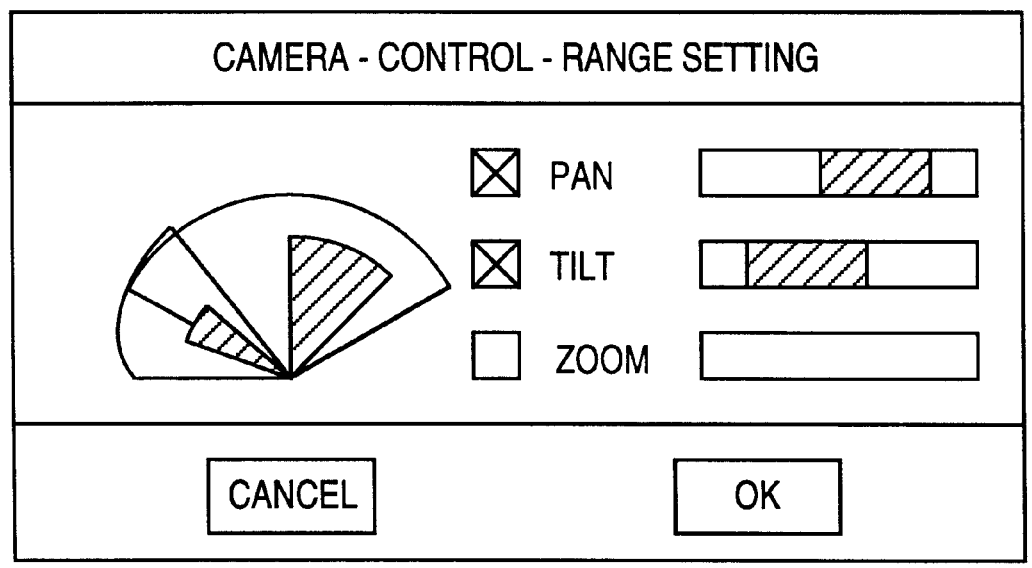
FIG. 29 shows a camera-control-range setting window.
Figure 30:
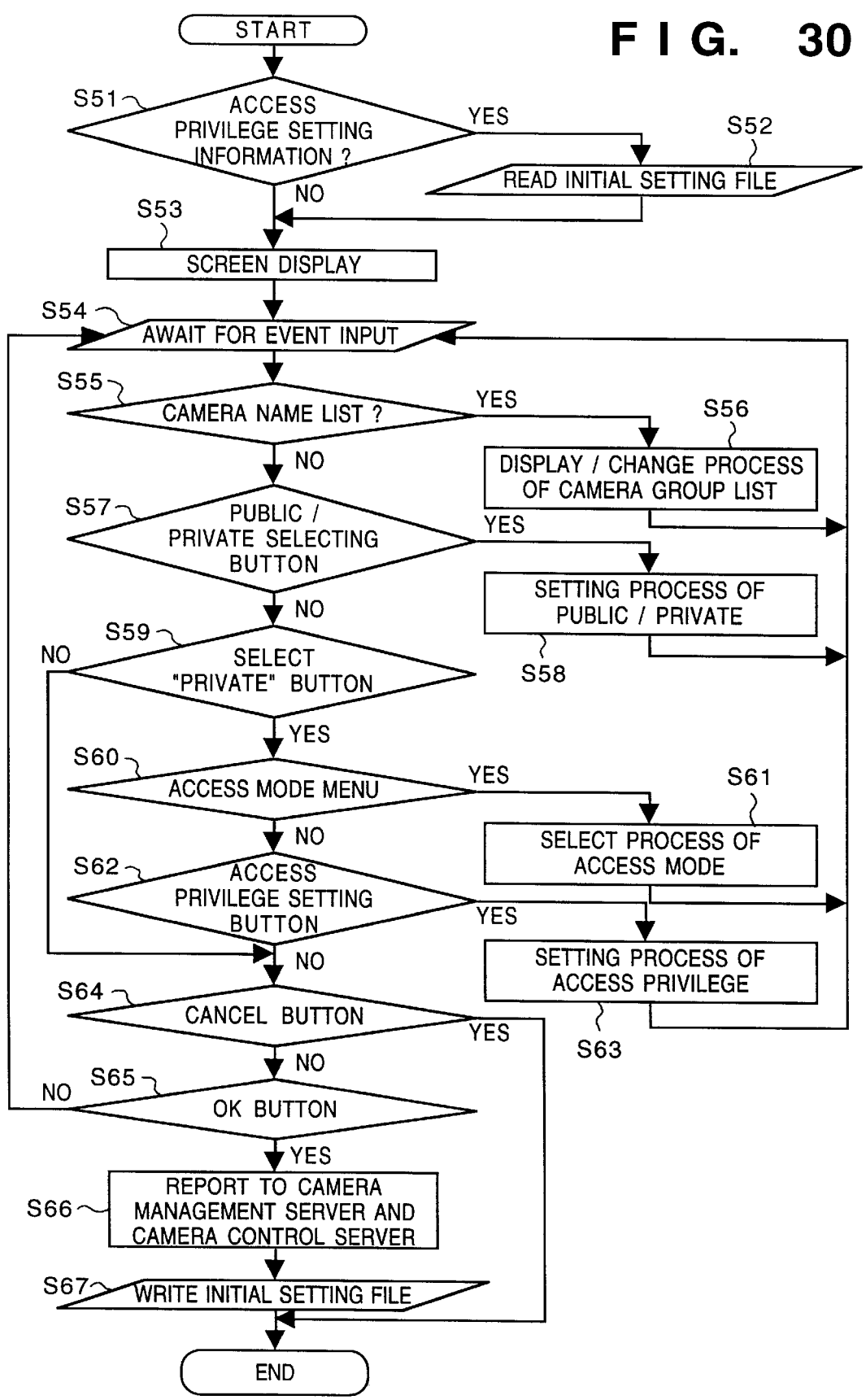
FIG. 30 is a flowchart showing basic processing of access-privilege setting for operating the access control panel shown in FIG. 18.

The settable access privileges are displayed in a menu form as shown in FIG. 22. With respect to sound and an image, a selection is made from two items: "permitted" or "not permitted"; and with respect to camera control, a selection is made from three items: "permitted," "partially permitted" or "not permitted" (S80–S85). In the case of camera control being partially permitted (S83), a camera-control-range setting window shown in FIG. 29 is opened, allowing to set the control range regarding panning, tilting and zooming (S84).

Upon completing the foregoing setting, an OK button is clicked, thereby ending the setting of an access privilege on the access privilege setting window in FIG. 21 (S87), and the inputted contents are reflected upon the current access privilege (S88).

When all the processing is completed with regard to setting of an access privilege, an OK button in the access control panel shown in FIG. 18 is clicked (S65), then the setting process of an access privilege ends. When the setting is completed, the camera control client 72 reports the newly-set conditions of the access privilege to the camera management server 68 (S66, S11) and updates the initial setting file (S67). In addition, in the case where the access privilege regarding camera control is partially permitted, the set condition of the access privilege is reported also to the camera control server 66. In response to the report, the camera management server 68 and camera control server 66 update the access conditions (S5, S8).

As apparent from the foregoing descriptions, according to the present embodiment, it is possible to prevent persons other than registered users from utilizing the system. Furthermore, detailed privacy-protection setting according to a request of a camera owner is possible. By utilizing a user interface which executes setting of the access privileges in hierarchies, from general setting to detailed setting, the operability of the system environment setting can be improved.

Modified Embodiment

Referring to FIG. 4 described in the above embodiment, the image display section 82 of the image display operation screen shows an image sent from a connected camera server. Selection of a camera is performed by selecting a desired camera from the camera list displayed in the camera condition display section 84. However, in such selection, it is difficult to determine the position and the image sensing direction of the camera.

In view of the above, in the modified embodiment, an example will be provided where the user interface has been improved. Note that physical or logical configurations of the apparatus and system adopt those shown in FIGS. 1–3 and descriptions thereof will be omitted.

Figure 32:
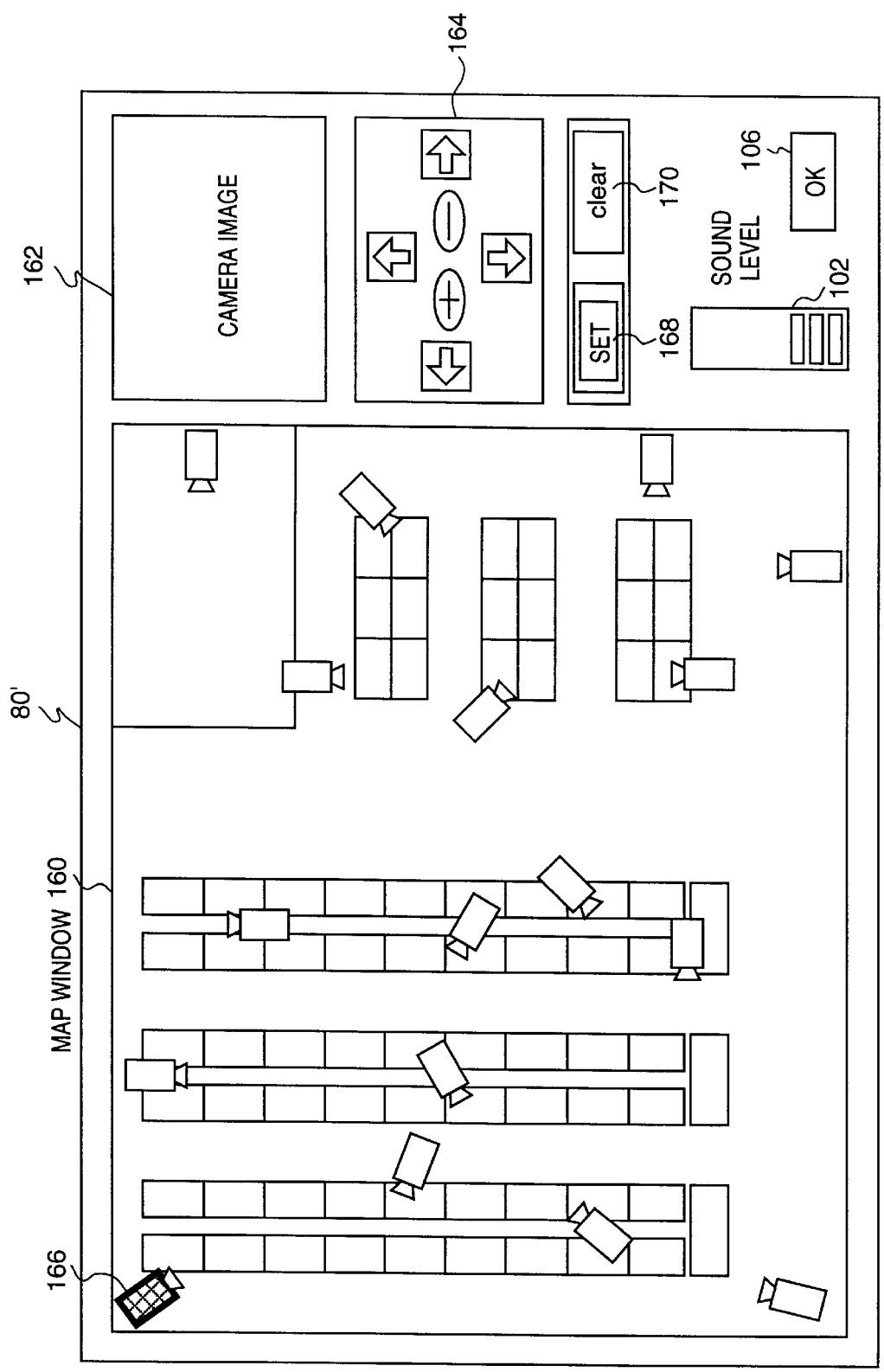
FIG. 32 shows a camera display control panel displayed on a display 35 by the camera control client according to a modified embodiment of the present invention.

FIG. 32 shows a modified embodiment of the image display operation window 80 shown in FIG. 4. The difference from FIG. 4 is in that a map window 160 is included. In the map window 160, as shown in FIG. 32, icons each representing each of the placed cameras are displayed. A camera icon 166, which represents a camera taking an image presently displayed in a camera-image window 162 (corresponding to the window 82 in FIG. 4), is displayed differently from other camera icons.

Note that for the purpose of simple explanation, a user of a terminal which displays the window 80' is assumed to be a system administrator. The camera icon 166 indicates the camera which is taking the image displayed in the camera-image window 162, and is displayed such that the icon 166 can be distinguished from other camera icons.

In addition, a camera icon corresponding to the camera operated by another user and a camera icon corresponding to a non-operated camera are displayed in different colors so that they are distinguishable. Information for such display is updated on the basis of information sent periodically from the camera management server. In this stage, an operated camera icon changes its direction in real time in accordance with operation of the corresponding camera.

Note that the window 80' shown in FIG. 32 is the same as the screens for general users. However, for a general user who does not possess a camera-management privilege, a camera icon is displayed in a special color to inform the user that the camera icon corresponding to a camera on which no management-privilege is provided, cannot be selected. In addition, with respect to a camera whose image can be seen but cannot be controlled, the camera icon is displayed in a distinguishable color.

An operation panel 164 is displayed below the camera-image window 162. The operation panel 164 includes a camera-rotating button for panning and tilting, and two buttons (+ and –) for zoom-in or zoom-out operation. By operating these buttons, rotation operation and zooming operation of an arbitrarily-designated camera is possible. If a selected camera cannot be operated (e.g., the selected camera is operated by another user, or the user does not have an operation privilege for the camera), the camera-rotating button and zoom buttons are displayed in an inoperable mode.

For instance, when a user desires to access (herein, remote operation) a certain camera, the subject camera icon is double-clicked. In response, the camera control client 72 requests a camera operation privilege to the camera management server 68, and the camera management server 68 determines whether or not the operation privilege of the subject camera has already been set for another user by referring to a camera condition list or the like which will be described later. When it is determined that the operation privilege of the camera has not been given to another user, the remote operation (including image display) of the camera is permitted, otherwise, the request for the camera operation privilege is rejected. When the request of the camera operation privilege is permitted, an image outputted from the camera is displayed in the camera-image window 162, enabling operation by the camera operation panel 164.

Below the operation panel 164, a setting button 168 for setting a display-not-permitted area, and a clear button 170 for canceling the set area are displayed. By these buttons, an area whose image is not permitted to display can be set in a camera control system in which an arbitrary camera is remotely controlled in all physically-operable ranges. For a camera in which the display-not-permitted area is set, displaying of an image is regulated so that the image within the display-not-permitted area is not displayed in the camera-image window 162. Details thereof will be described later.

Note that although the system administrator can set a display-not-permitted area for all the cameras, as has been described, a camera manager who possesses the camera-management privilege of only a particular camera can perform such setting for the management-subject camera only.

Figure 33:
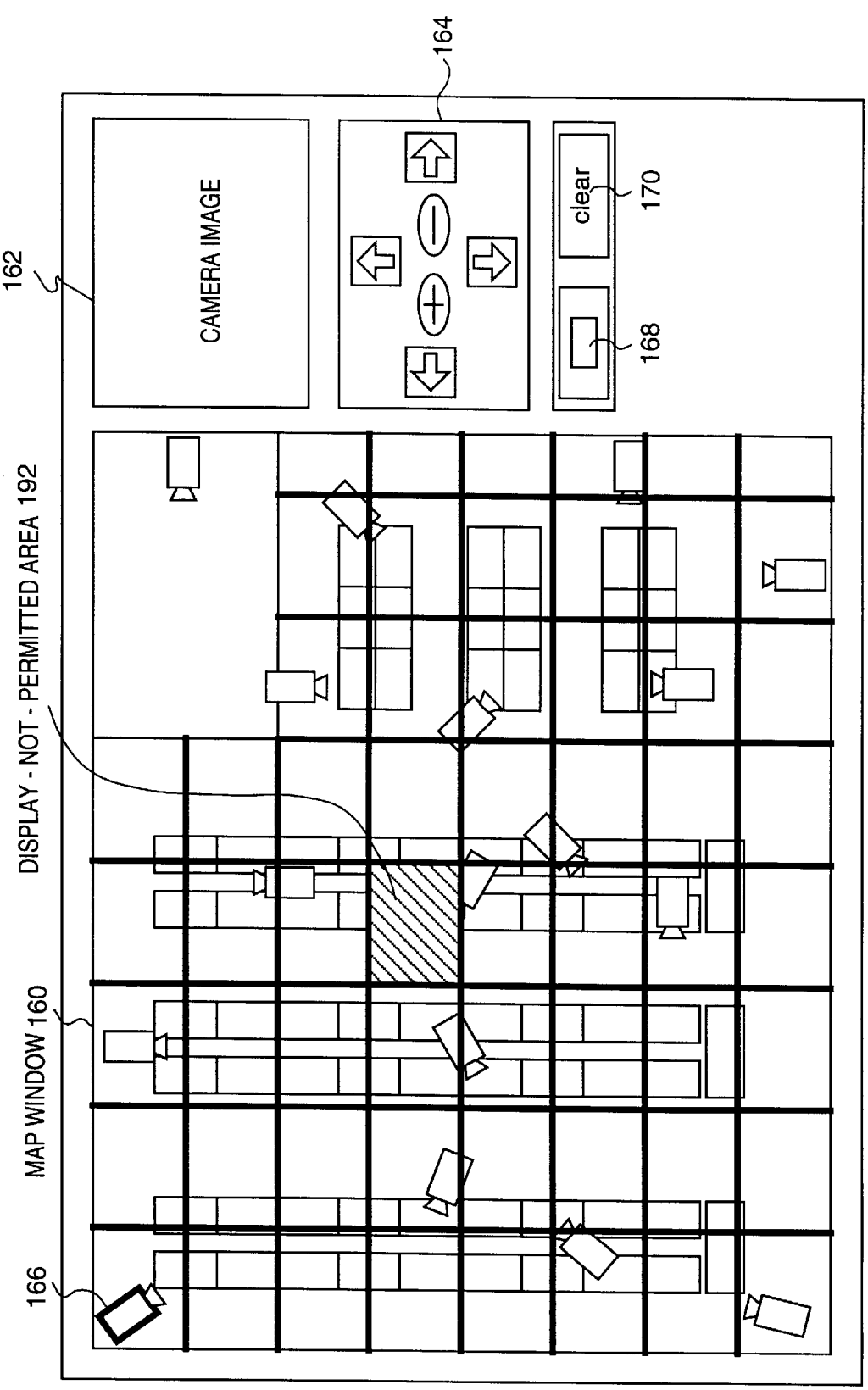
FIG. 33 is an explanatory view for setting a display-not-permitted area.

When a user clicks the setting button 168, the camera control client 72 draws vertical and horizontal lines in the map window 160 as shown in FIG. 33. The area divided by the lines is the unit of setting the display-not-permitted area. The user designates, on the map window 160, one or a plurality of the divided areas where displaying of an image should not be permitted. The designated divided area (e.g. an area 192 in FIG. 33) is displayed with a red frame so that the area is easily distinguished from other divided areas. When the display-not-permitted area is to be canceled, the clear button 170 is clicked with a mouse.

Note that in the above example, the display-not-permitted area is set for a camera corresponding to the camera icon 166. However, if a user possesses a camera-management privilege for more than one camera, the setting of the display-not-permitted area may be performed all at once. In this case, all of the subject cameras (distinguishable by the display mode) are selected, then an area whose image is not to be displayed is set. The set display-not-permitted area is informed to the camera management server 68 and registered. Such display-not-permitted area applies to users or user groups which are set separately.

Figure 34:
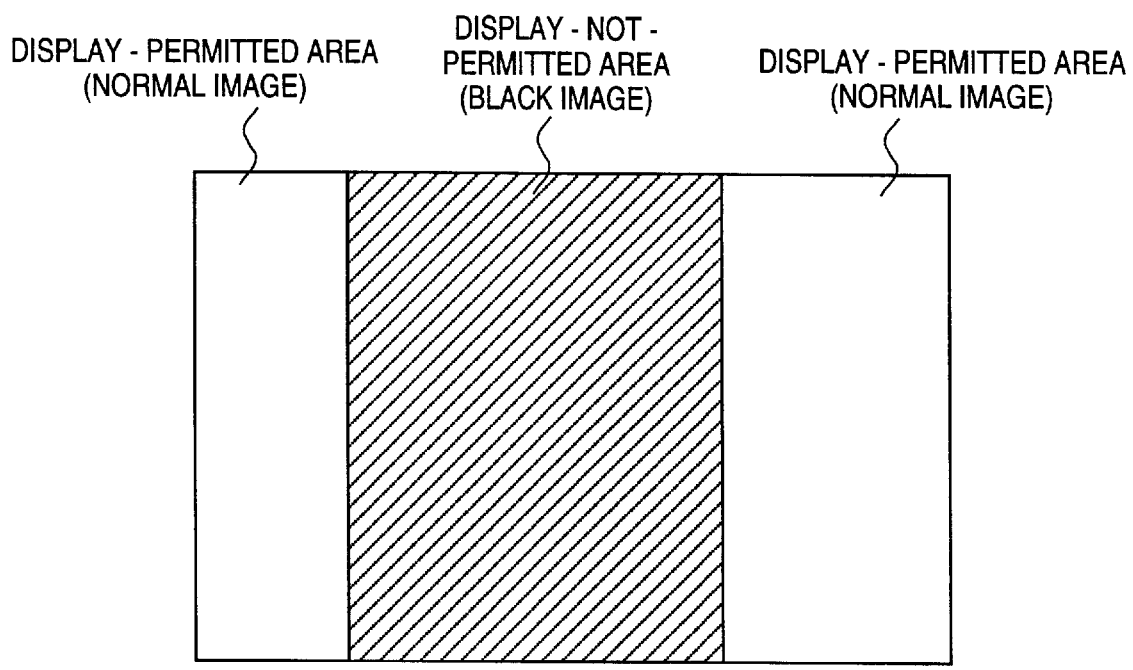
FIG. 34 is a display example of a camera-image window 162 in which a display-not-permitted area is set.

FIG. 34 shows a display example of the camera-image window 162 where a display-not-permitted area is set. In FIG. 34, the display-not-permitted area is set in the central section of the video range. If the camera pans such that its video range partially or entirely overlaps with the display-not-permitted area, the image in the display-not-permitted area is displayed in black as shown in FIG. 34 to conceal the image; yet, for the other areas, images taken by the camera are displayed normally. Along with panning or zooming of the camera by camera control, the black portion indicative of the display-not-permitted area moves.

Figure 35:
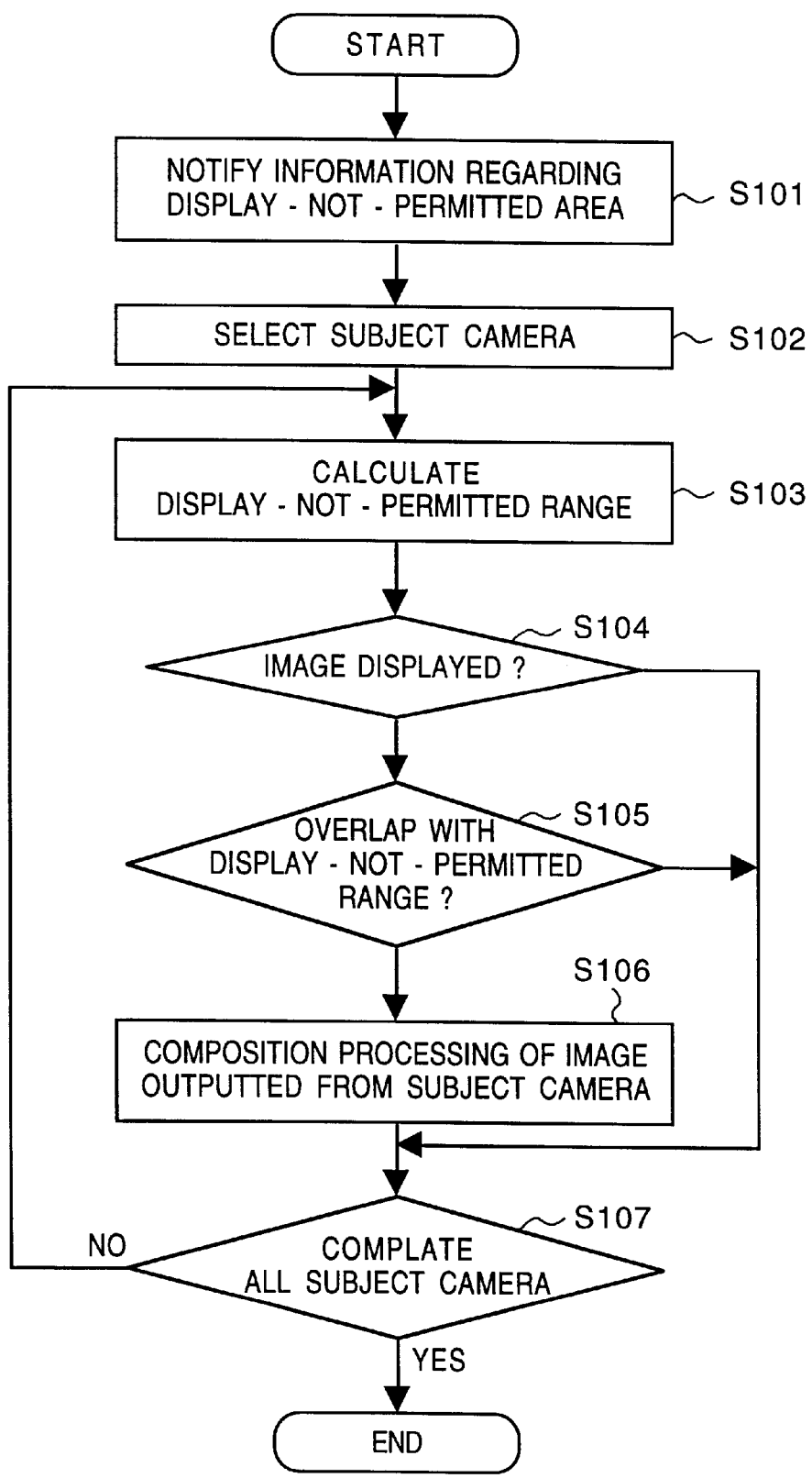
FIG. 35 is a flowchart showing processing of the camera management server 68 related to setting and changing of a display-not-permitted area.

FIG. 35 is a flowchart showing basic processing of the camera management server 68 with regard to setting and changing of the display-not-permitted area. When the display-not-permitted area is set or changed, the set information (new setting or changed setting) is notified from the camera control client 72 to the camera management server 68 (S101). Then, the camera management server 68 obtains coordinates data (coordinates of diagonal points of a rectangle) for the display-not-permitted area which has been set.

The camera management server 68 selects a subject camera to which a display-not-permitted area is to be set. Herein, a camera corresponding to the camera icon 166 is selected.

The camera management server 68 calculates a display-not-permitted range of each of the selected cameras (hereinafter referred to as a camera i) by executing an equation to be described later (S103). The camera management server 68 then determines whether or not an image taken by the camera i is presently displayed on any of the communication terminals (S104). If the image taken by the camera i is presently displayed on a terminal, it is determined if the video range (the range displayed in the camera-image window 162 in FIG. 33) overlaps with the display-not-permitted range (S105). If the video range overlaps, at least partially, with the display-not-permitted range (S105), the camera management server 68 sends an instruction to the image/sound communication software of the host connected to the camera i, to execute composition processing where an image portion corresponding to the display-not-permitted area is made into a black image, so that the image portion corresponding to the display-not-permitted area is concealed in the image taken by the camera i as shown in FIG. 34 (S106). The composition processing will be described later in detail. The image/sound communication software performs data compression on an image taken by the camera i (if the image overlaps with the display-not-permitted area, on the composite image) by executing an image compression/decompression process, and outputs the result to the network via the network interface 36.

The image/sound communication software, which has received the image taken by the camera i from the network, decompresses the compressed image data by executing the image compression/decompression process, and supplies the result to the bitmap display 35 via the video board 34 for displaying an image.

Steps S103 to S106 are executed for all the cameras selected in step S102 (S107).

Figure 36:
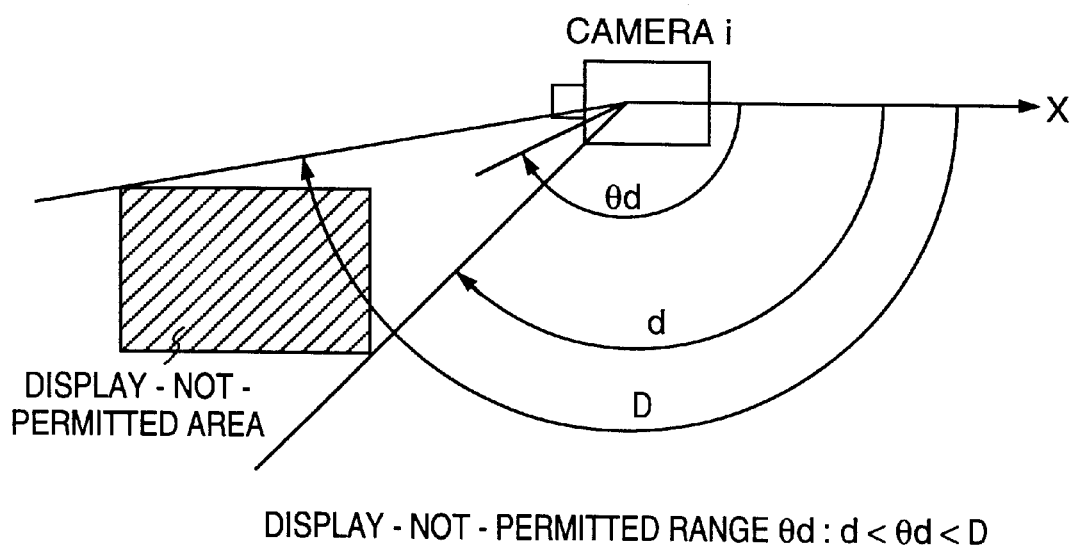
FIG. 36 is an explanatory view of a display-not-permitted range.

The display-not-permitted range is calculated in the following manner (S103). That is, with respect to a subject camera i as shown in FIG. 36, on the basis of coordinates data indicating a camera location and a display-not-permitted area, the display-not-permitted range $\theta d$ ($d<\theta d<D$) is calculated. The references d and D are expressed by an angle from the line x (horizontal line).

FIG. 37 shows an example of a camera-condition table which stores fixed information and current information of each camera managed by the camera management server 68. The table includes a camera number, a camera name, a host name, coordinates indicative of a camera location on the map, an initial angle of a camera at the start-up time of each camera server, a present angle of the camera, present video range and the like. The present video range is expressed by an angle from the line x (horizontal line), as similar to the references d and D.

The camera management server 68 constantly checks the camera-condition table, observing an overlap of the video range with the display-not-permitted range of the camera. In addition, the camera management server 68 regularly transfers the contents of the camera-condition table to the camera control client 72. The camera control client 72 updates directions of the camera icons on the map window 160 displayed on the display 35, on the basis of the information from the camera management server 68.

Figure 38:
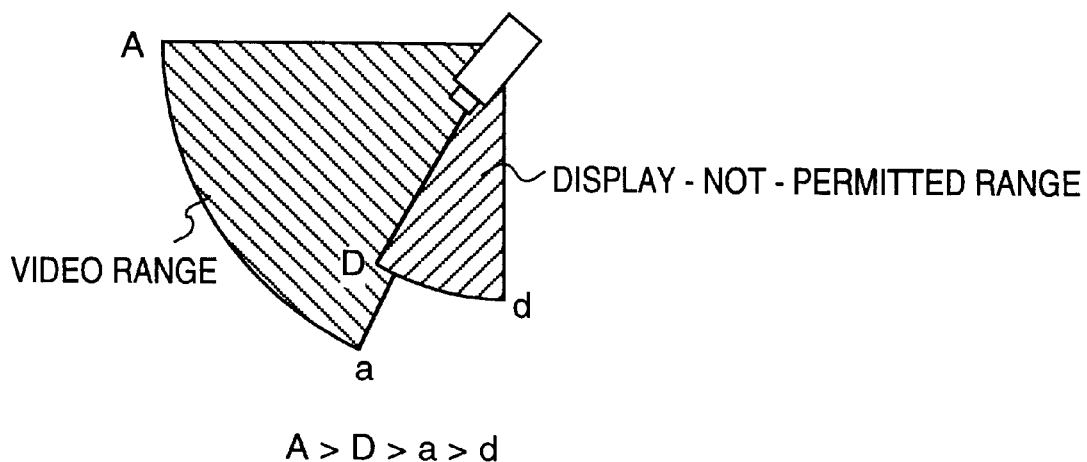
FIG. 38 is an explanatory view of a video range and a display-not-permitted range.

The composition processing in step S106 in FIG. 35 for regulating image display will now be described. On the basis of the display-not-permitted range obtained from the display-not-permitted area and a present video range of the camera, a portion to be displayed in black on the image display window is calculated and image composition is executed. As shown in FIG. 38, it is assumed that the video range is (a, A) and the display-not-permitted range is (d, D). There are three cases where the display-not-permitted range overlaps with the video range. They are:

(1) A>D>a>d
(2) A>D>d>a
(3) D>A>d>a

FIGS. 39, 40 and 41 show the examples of image display in each of the above cases.

To paint out the display-not-permitted portion with a black image as shown in FIGS. 39–41, the range to be made into a black image can be calculated by executing a simple equation. FIG. 42 shows a calculation example in the case of FIG. 39. In FIG. 42, a ratio between We and wd is obtained by the following equation:

$$We:wd = \{\tan((A+a)/2) + \tan((A+a)/2 - D)\} : \{\tan((A+a)/2) - \tan((A+a)/2 - D)\}$$

where We: a range where the display-not-permitted area does not overlap with the video range; and wd: a range where the display-not-permitted area overlaps with the video range.

An image taken by a camera is divided in the ratio We:wd in the horizontal direction, and a black image is overlaid on a rectangular area corresponding to wd. Also, in the cases shown in FIGS. 40 and 41, the position and width of the black image can be obtained by the similar calculation.

Figure 43:
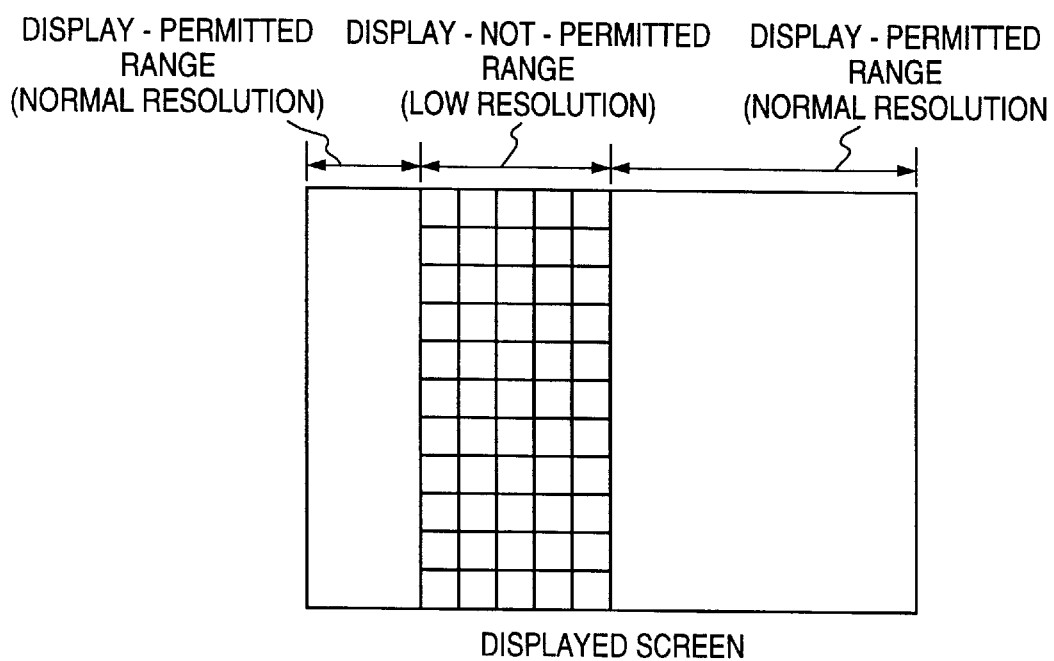
FIG. 43 shows another display example of displaying a display-not-permitted area.
Figure 44:
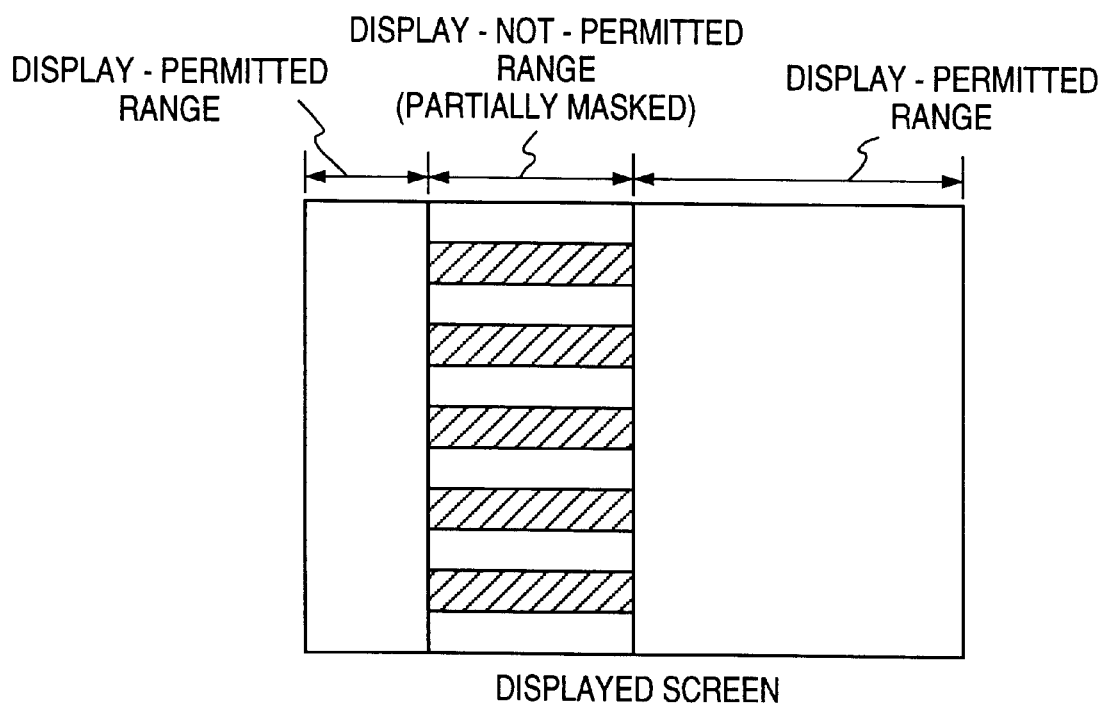
FIG. 44 shows another display example of displaying a display-not-permitted area.

In the above embodiment, the display-not-permitted area is displayed in black as shown in FIG. 34 so that substantially no image is displayed on the camera-image window 162. However, various image processing methods can be applied for this. For instance, as shown in FIG. 43, an image in the display-not-permitted area may be displayed in a mosaic form where resolution is much lower than normal resolution. As shown in FIG. 44, the image may be displayed in stripes so that the image in the display-not-permitted area is partially displayed.

The present invention can be applied to a system constituted by a plurality of devices or to an apparatus comprising a single device. The invention is applicable also to a case where the invention is embodied by supplying a program to a system or apparatus. In this case, a storage medium, storing a program according to the invention constitutes the invention. The system or apparatus installed with the program read from the medium realizes the functions according to the invention.

As can be easily seen from the foregoing descriptions, according to the modified embodiment of the present invention, if a camera whose image is displayed on a screen tries to display an area where image-display prohibition is set on the map, the image corresponding to the display-not-permitted area is concealed on the image display screen, and other image portions are displayed normally. By virtue of the function which conceals only the display-not-permitted area, unnecessary restriction of image display is prevented.

Moreover, according to the modified embodiment of the present invention, an image in the display-not-permitted area is displayed in a lower resolution than other image area, or only a limited area is displayed. By virtue of the above function, privacy of a user who sets the display-not-permitted area is protected. In addition, an image can be sent to other general users such that the users can get an idea of what the image in the display-not-permitted area looks like, so that such restriction does not offend the general users.

Note that in the foregoing modified embodiment, processing such as masking of an image in the display-not-permitted area or the like is performed by the apparatus to which the camera is connected. However, the processing may be performed by a client who receives and displays the image. The client in the receiver's side can obtain information related to a display-not-permitted area with respect to a camera displaying an image, from the camera management server 68, and can apply the received information. As a result, the following effect can be attained. Assuming that an image from one camera is displayed on a display screen of user A who is a camera manager and a display screen of user B who is a general user. Even if a camera server transfers the same image to each of the users, the user B cannot see an accurate image of a display-not-permitted area while the user A can see all the image. The above operation is realized because the camera management server 68 regularly notifies information corresponding to the user (client) to each client.

In addition, in the foregoing modified embodiment, processing such as masking of an image in the display-not-permitted area or the like is performed in the camera-server side utilizing a software. However this can be realized by hardware. In addition, image compression processing and decompression processing of the received compressed image data for transferring a video image may be executed by dedicated hardware.

Figure 45:
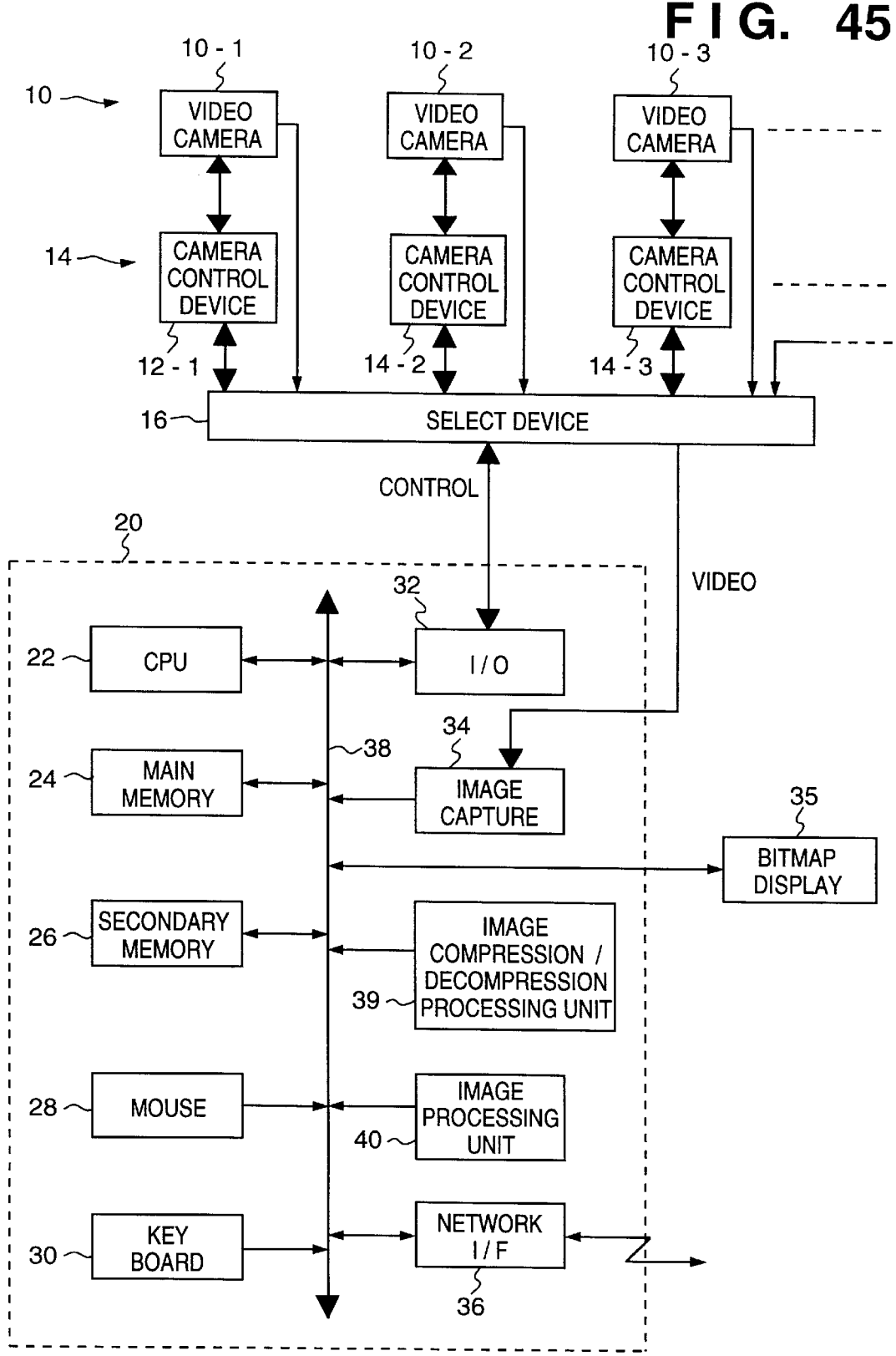
FIG. 45 is a block diagram of a computer system adopting another basic structure.

FIG. 45 shows a configuration of the apparatus in a case where processing for images in the display-not-permitted area is performed by an image processing unit 40 and the compression processing is performed by an image compression/decompression processing unit 39.

Figure 46:
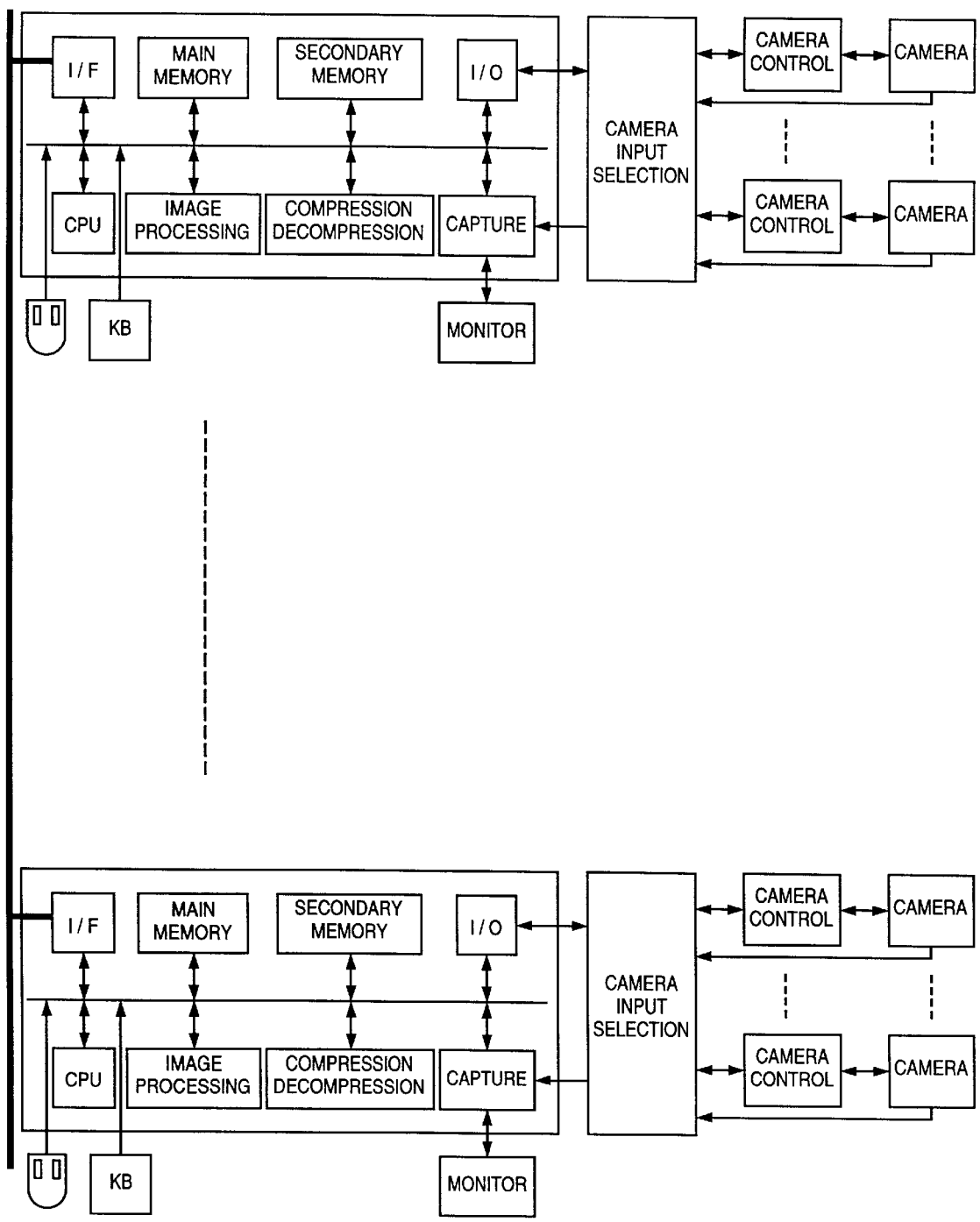
FIG. 46 is a block diagram showing another example of a hardware structure of the present embodiment in a network.
Figure 47:
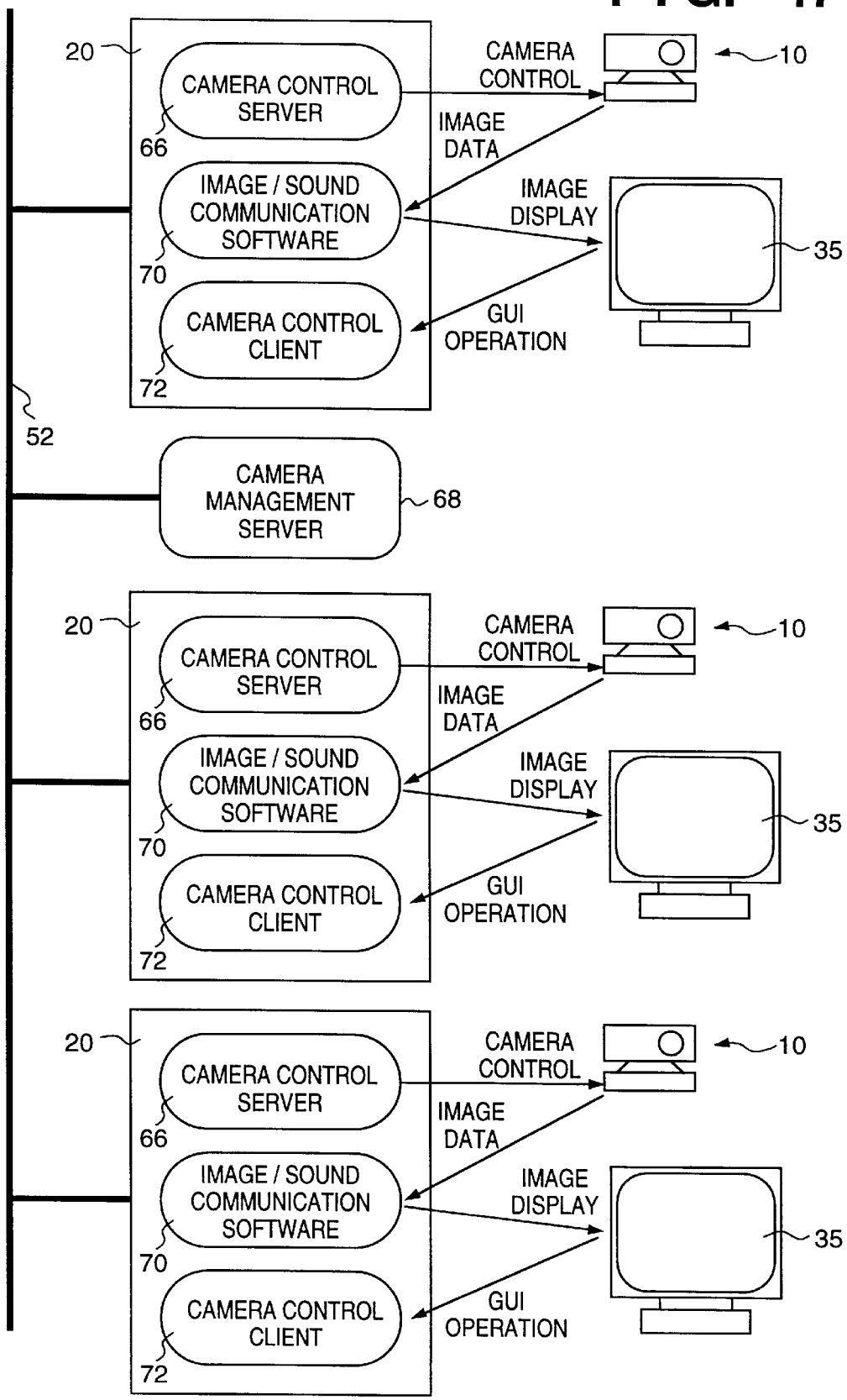
FIG. 47 is a block diagram showing another example of a software structure of the present embodiment in a network.

More specifically, as shown in FIG. 46, the image processing unit 40 (FIG. 45) and image compression/decompression processing unit 39 (FIG. 45) are established for all terminals. FIG. 47 shows the processing steps performed in each terminal in the above case, and corresponds to FIG. 3. By virtue of the above units, it is possible to reduce load of a CPU in each terminal and reduce the amount of data transferred in the network thereby providing users with an effective environment.

The object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the new functions according to the invention, and the storage medium storing the program codes constitutes the invention.

Further, the storage medium, such as a floppy disk, hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (Operating System) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part or entire process in accordance with designations of the program codes and realizes functions of the above embodiments.

The present invention is not limited to the above embodiments and various changes and modifications can be made within the spirit and scope of the present invention. Therefore, to appraise the public of the scope of the present invention, the following claims are made.

What is claimed is:

1. A camera control system for selecting a camera from a plurality of controllable cameras connected to a network, displaying an image taken by the selected camera and performing control of the selected camera, comprising:

map display means for displaying a map representing the relative area where the plurality of controllable cameras are set;

symbol display means for displaying at least one camera symbol representing a camera on the map displayed by said map display means;

display-not-permitted area setting means for setting a display-not-permitted area where taking video is prohibited on the map displayed by said map display means for each of clients on the network; and transmitting means for transmitting an image taken by the selected camera as well as information regarding each of the clients, so as to restrict the display of images for each of the clients according to the display-not-permitted areas set for each of the clients.

2. The camera control system according to claim 1, wherein, each of the clients comprising camera-image-display regulate means for substantially prohibiting displaying of an overlapped portion of the video image, with respect to a camera subjected to restriction, when a range of the set display-not-permitted area and a video range of the subject camera overlap.

3. The camera control system according to claim 2, wherein, with respect to a camera subjected to restriction, when a range of the set display-not-permitted area and a video range of the subject camera overlap, the overlapped portion of the video image is displayed in significantly-lower resolution compared to other portions of the image.

4. The camera control system according to claim 2, wherein, with respect to a camera subjected to restriction, when a range of the set display-not-permitted area and a video range of the subject camera overlap, the overlapped portion of the video image is partially displayed.

5. A camera control system for selecting a camera from a plurality of controllable cameras connected to a network, displaying an image taken by the selected camera and performing control of the selected camera, comprising:

display-not-permitted area setting means for setting a display-not-permitted area for each of clients on the network; and transmitting means for transmitting the image taken by the selected camera, as well as information regarding each of the clients, so as to restrict the display of images for each of the clients according to the display-not-permitted areas set for each of the clients.

6. The system according to claim 5, wherein said display-not-permitted area setting means selects a plurality of cameras to which the display-not-permitted area is set prior to set the display-not-permitted area on the map displayed by said map display means.

7. A method for selecting a camera from a plurality of controllable cameras connected to a network and displaying an image taken by, and performing control of, the selected camera comprising the steps of:

setting a display-not-permitted area for each of a plurality of clients on the network;

transmitting the image from the selected camera, as well as information regarding each of the clients and their respective display-not-permitted area, to each of the clients in order to restrict the viewing display of each of the clients according to their status on the network.

8. A computer readable program, stored in a storage medium for selecting a camera from a plurality of controllable cameras connected to a network and displaying an image taken by, and performing control of, the selected camera, said program comprising:

an input step of inputting data from a transmission source via a network;

a storing step of storing the data into a memory device;

an output step of outputting, by an output device, the data stored in the memory device, on the basis of a predetermined operation;

a display-not-permitted step for setting a display-not-permitted area for a plurality of clients on a network; and a transmitting step for transmitting an image from the selected camera, as well as information for each of the clients set in the display-not-permitted area, to each of the clients in order to restrict the viewing display of each of the clients according to their status on the network.

* * * * *